(12) United States Patent
Aonuma et al.

(10) Patent No.: US 11,135,519 B2
(45) Date of Patent: Oct. 5, 2021

(54) STORAGE MEDIUM, INFORMATION PROCESSING APPARATUS, INFORMATION PROCESSING SYSTEM AND INFORMATION PROCESSING METHOD

(71) Applicant: NINTENDO CO., LTD., Kyoto (JP)

(72) Inventors: Eiji Aonuma, Kyoto (JP); Shingo Watanabe, Tokyo (JP)

(73) Assignee: Nintendo Co., Ltd., Kyoto (JP)

(*) Notice: Subject to any disclaimer, the term of this patent is extended or adjusted under 35 U.S.C. 154(b) by 0 days.

(21) Appl. No.: 16/893,955

(22) Filed: Jun. 5, 2020

(65) Prior Publication Data
US 2020/0384368 A1 Dec. 10, 2020

(30) Foreign Application Priority Data
Jun. 10, 2019 (JP) .............................. JP2019-107634

(51) Int. Cl.
*A63F 13/69* (2014.01)
*A63F 13/56* (2014.01)

(52) U.S. Cl.
CPC .............. *A63F 13/69* (2014.09); *A63F 13/56* (2014.09); *A63F 2300/609* (2013.01)

(58) Field of Classification Search
CPC ..... A63F 13/69; A63F 13/56; A63F 2300/609
See application file for complete search history.

(56) References Cited

U.S. PATENT DOCUMENTS

2010/0197389 A1   8/2010   Ueda

FOREIGN PATENT DOCUMENTS

| JP | 09-140933 | 6/1997 |
|---|---|---|
| JP | 2010-172656 | 8/2010 |
| JP | 2013-059546 | 4/2013 |
| JP | 2015-16127 | 1/2015 |
| JP | 2016-158839 | 9/2016 |

*Primary Examiner* — Ronald Laneau
*Assistant Examiner* — Matthew D Hoel
(74) *Attorney, Agent, or Firm* — Nixon & Vanderhye PC

(57) ABSTRACT

A non-limiting example game system includes a processor incorporated within a main body apparatus, and the processor creates, based on operation inputs of a player, a game stage by selecting components corresponding to a virtual room and by arranging panels corresponding to the components on a grid-shaped arrangement area. In the virtual room, a passage, a stairs, a door with lock blocking the passage and a treasure chest are arranged. A key for releasing the door with lock is contained in the treasure chest. The player creates the game stage by connecting all of the passages and the stairs from a start room that a game is started to a room where a boss enemy object is arranged and by taking arrangement of the doors with lock and the treasure chests containing the key into consideration.

18 Claims, 27 Drawing Sheets

PANEL (TREASURE CHEST EXISTS, ONE PASSAGE)

PANEL (ONE STAIRS EXISTS, ONE PASSAGE)

ADJACENT TWO PANELS (LOCKED DOOR EXISTS IN PASSAGE)

ADJACENT TWO PANELS (BOSS LOCKED DOOR EXISTS IN PASSAGE)

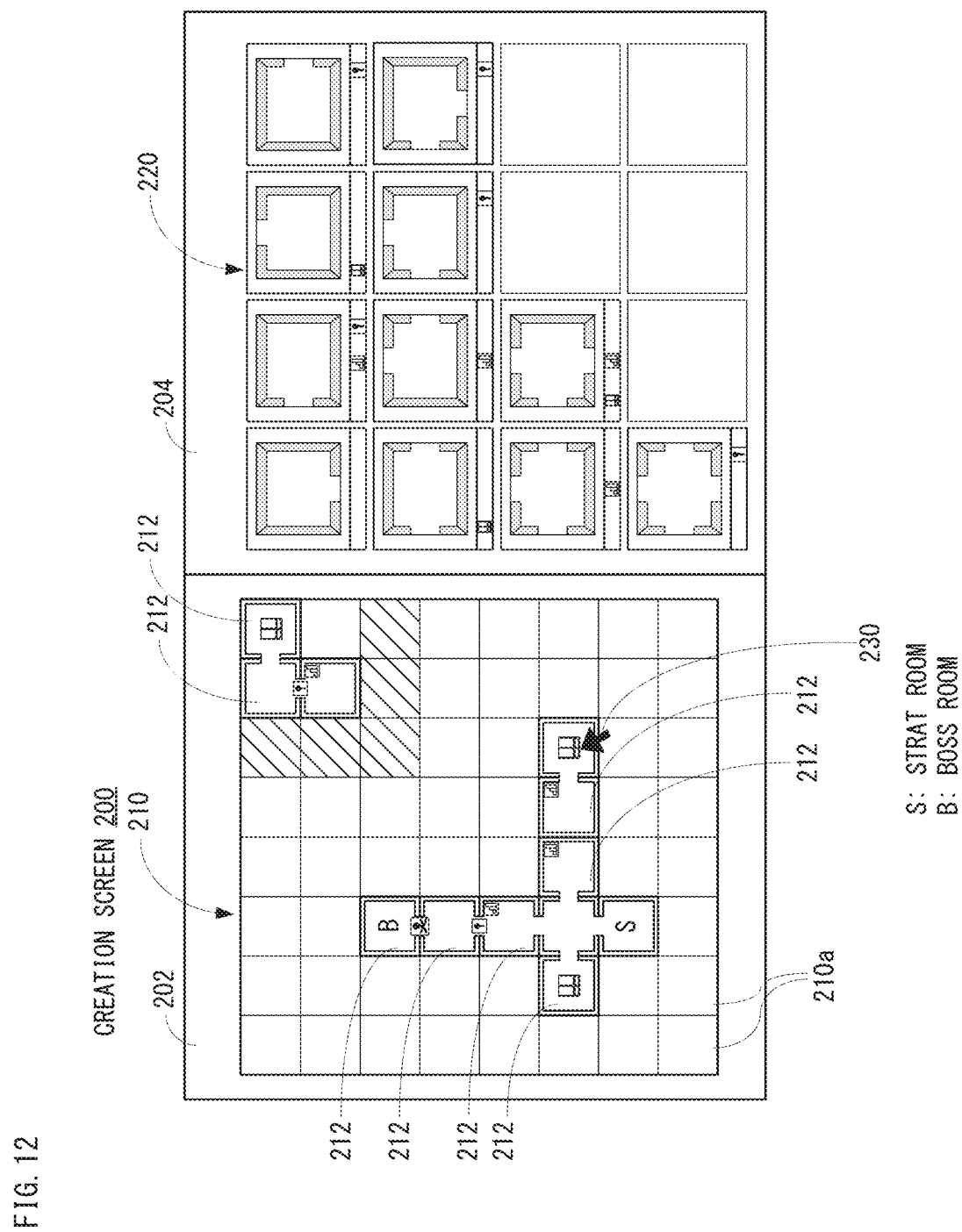

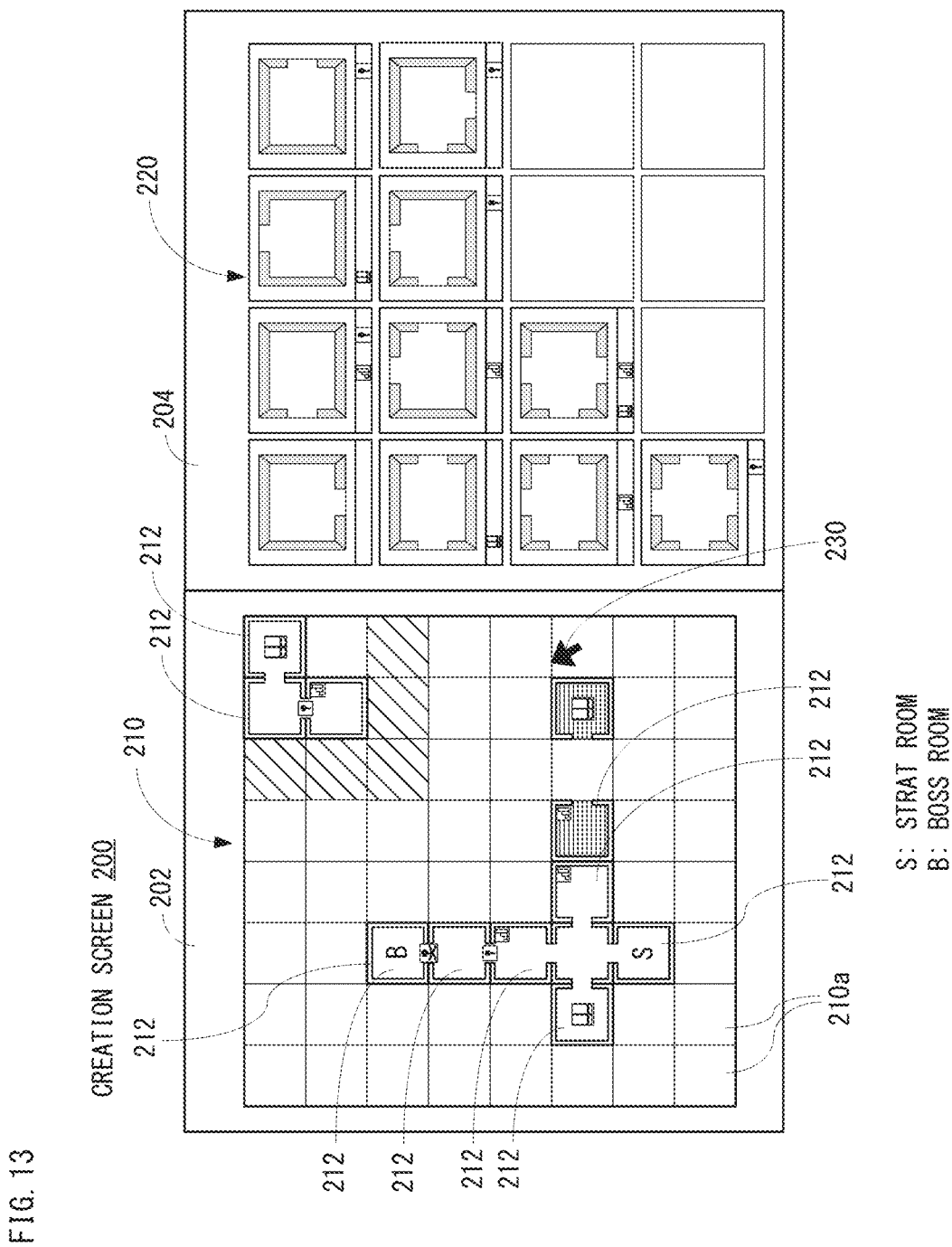

STORAGE MEDIUM, INFORMATION PROCESSING APPARATUS, INFORMATION PROCESSING SYSTEM AND INFORMATION PROCESSING METHOD

CROSS REFERENCE OF RELATED APPLICATION

The disclosure of Japanese Patent Application No. 2019-107634 filed on Jun. 10, 2019 is incorporated herein by reference.

FIELD

This application describes a storage medium, an information processing apparatus, an information processing system and an information processing method, in which a game stage for playing a game is created.

SUMMARY

It is a primary object of an embodiment(s) to provide a novel storage medium, information processing apparatus, information processing system and information processing method.

It is another object of the embodiment(s) to provide a storage medium, information processing apparatus, information processing system and information processing method, capable of creating a complicated game stage.

A first embodiment is a non-transitory computer-readable storage medium storing an information processing program that is executable by a computer of an information processing apparatus to create a game stage for playing a game, wherein the information processing program causes one or more processors of the computer to execute: setting an initial position of a player object in the game stage; arranging in a position in the game stage a prohibition element prohibiting the player object from passing through in the game, the position being based on designation by a user; arranging in a position in the game stage a release element releasing the prohibition element to allow the player object to pass through in the game, the position being based on designation by the user; determining whether the player object can arrive at a specific position on the game stage based on the initial position, the number and arranged position of the prohibition element, and the number and arranged position of the release element; and generating, generating, on condition that it is determined that the player object can arrive at the specific position, an indication that indicates to the user that the player object can arrive at the specific position.

A second embodiment is the storage medium according to the first embodiment, wherein the information processing program causes the one or more processors to execute performing the game where the player object is operated in a game space based on the game stage.

A third embodiment is the storage medium according to the second embodiment, wherein the information processing program causes the one or more processors to execute setting in the game stage a clear condition for clearing the game stage.

A fourth embodiment is the storage medium according to the third embodiment, wherein the information processing program causes the one or more processors to execute setting in the game stage an end position that is a position necessary to be arrived at in order to satisfy the clear condition; and arranging in the game stage a first prohibition element that is the prohibition element that prohibits passing to the end position, wherein the first prohibition element is released by a first release element that is different from a second release element that releases a second prohibition element that is the prohibition element other than the first prohibition element.

A fifth embodiment is the storage medium according to the fourth embodiment, wherein the information processing program causes the one or more processors to execute setting the release element that the player object obtains lastly as the first release element.

A sixth embodiment is the storage medium according to the third embodiment, wherein the information processing program causes the one or more processors to execute arranging in a position in the game stage a potential release element from which the release element is obtainable, the position being based on designation by the user, and wherein on condition that the clear condition can be satisfied even if the release element is not obtained from the potential release element, the release element is not obtained from the potential release element.

A seventh embodiment is the storage medium according to the second embodiment, wherein the release element is obtained by the player object, and the information processing program causes the one or more processors to execute reducing the number of release element possessed by the player object every time that the player object releases the prohibition element.

An eighth embodiment is the storage medium according to the first embodiment, wherein the information processing program causes the one or more processors to execute arranging a special transfer element by which the player object is movable from a position in the game stage to a further separate position, the position being based on designation by the user.

A ninth embodiment is the storage medium according to the first embodiment, wherein the information processing program causes the one or more processors to execute outputting information for indicating a position that the player object can arrive at from the initial position in a manner distinguishable from a position that the player object cannot arrive at.

A tenth embodiment is the storage medium according to the first embodiment, wherein the information processing program causes the one or more processors to execute generating the game space based on a game component arranged by the user.

An eleventh embodiment is the storage medium according to the tenth embodiment, wherein the game component expresses at least one of a room and a passage in the game stage.

A twelfth embodiment is the storage medium according to the tenth embodiment, wherein the information processing program causes the one or more processors to execute arranging the prohibition element based on arrangement of the game component including the prohibition element.

A thirteenth embodiment is the storage medium according to the tenth embodiment, wherein the information processing program causes the one or more processors to execute arranging the release element based on arrangement of the game component including the release element.

A fourteenth embodiment is the storage medium according to the tenth embodiment, wherein the game component is a panel that is to be arranged within a predetermined arrangement frame.

A fifteenth embodiment is the storage medium according to the first embodiment, wherein the information processing program causes the one or more processors to execute determining that the game stage is completed on condition that the specific position necessary to satisfying the clear condition can be arrived at, and allowing to play the game on condition that it is determined that the game stage is completed.

A sixteenth embodiment is an information processing apparatus that creates a game stage for playing a game, and comprises one or more processors configured to execute: setting an initial position of a player object in the game stage; arranging in a position in the game stage a prohibition element prohibiting the player object from passing through in the game, the position being based on designation by a user; arranging in a position in the game stage a release element releasing the prohibition element to allow the player object to pass through in the game, the position being based on designation by the user; determining whether the player object can arrive at a specific position on the game stage based on the initial position, the number and arranged position of the prohibition element, and the number and arranged position of the release element; and generating, on condition that it is determined that the player object can arrive at the specific position, an indication that indicates to the user that the player object can arrive at the specific position.

A seventeenth embodiment is an information processing system that creates a game stage for playing a game, and comprises one or more processors configured to execute: setting an initial position of a player object in the game stage; arranging in a position in the game stage a prohibition element prohibiting the player object from passing through in the game, the position being based on designation by a user; arranging in a position in the game stage a release element releasing the prohibition element to allow the player object to pass through in the game, the position being based on designation by the user; determining whether the player object can arrive at a specific position on the game stage based on the initial position, the number and arranged position of the prohibition element, and the number and arranged position of the release element; and generating, on condition that it is determined that the player object can arrive at the specific position, an indication that indicates to the user that the player object can arrive at the specific position.

An eighteenth embodiment is an information processing method executed by an information processing system that creates a game stage for playing a game, comprising: setting an initial position of a player object in the game stage; arranging in a position in the game stage a prohibition element prohibiting the player object from passing through in the game, the position being based on designation by a user; arranging in a position in the game stage a release element releasing the prohibition element to allow the player object to pass through in the game, the position being based on designation by the user; determining whether the player object can arrive at a specific position on the game stage based on the initial position, the number and arranged position of the prohibition element, and the number and arranged position of the release element; and generating, on condition that it is determined that the player object can arrive at the specific position, an indication that indicates that the player object can arrive at the specific position.

The above described objects and other objects, features, aspects and advantages of the embodiment(s) will become more apparent from the following detailed description when taken in conjunction with the accompanying drawings.

BRIEF DESCRIPTION OF THE DRAWINGS

FIG. 12 is a view showing a non-limiting third example creation screen of a game stage.

FIG. 13 is a view showing a non-limiting fourth example creation screen of a game stage.

DETAILED DESCRIPTION OF NON-LIMITING EXAMPLE EMBODIMENTS

A non-limiting example game system according to an exemplary embodiment will be described in the following. The non-limiting example game system 1 according to this embodiment comprises a main body apparatus (an information processing apparatus that functions as a game apparatus main body in this embodiment) 2, a left controller 3 and a right controller 4. The left controller 3 and the right controller 4 are attachable to or detachable from the main body apparatus 2, respectively. That is, the game system 1 can be used as a unified apparatus formed by attaching each of the left controller 3 and the right controller 4 to the main body apparatus 2. Moreover, in the game system 1, the main body apparatus 2, the left controller 3 and the right controller 4 can also be used as separate bodies (see FIG. 2). In the following, the hardware structure of the game system 1 according to this embodiment will be described, and then, the control of the game system 1 of this embodiment will be described.

Figure 1:
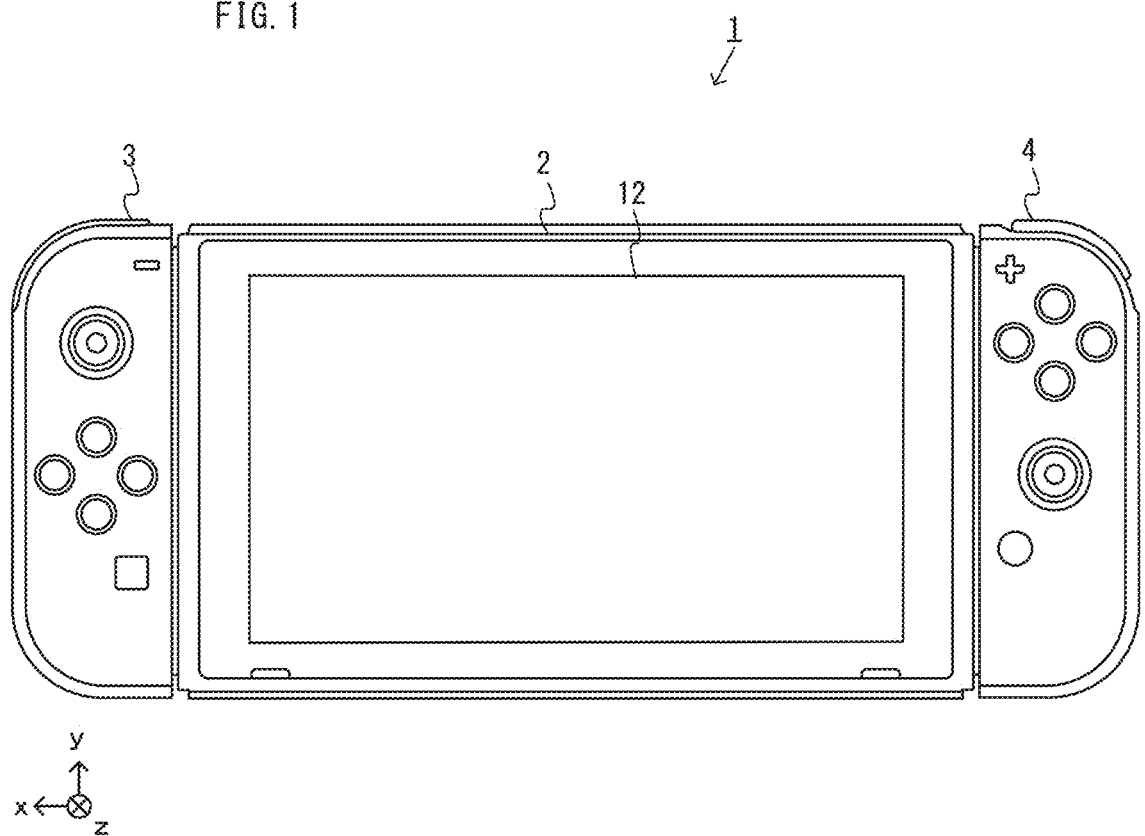
FIG. 1 is an illustration view showing a non-limiting example state wherein a left controller and a right controller are attached to a main body apparatus of this embodiment.

FIG. 1 is an illustration view showing an example of a state where the left controller 3 and the right controller 4 are attached to the main body apparatus 2. As shown in FIG. 1, the left controller 3 and the right controller 4 is respectively attached to the main body apparatus 2, thereby to be unified it. The main body apparatus 2 is an apparatus for performing various processing (game processing, for example) in the game system 1. The main body apparatus 2 comprises a display 12. Each of the left controller 3 and the right controller 4 is a device comprising an operation section with which a user provides inputs.

Figure 2:
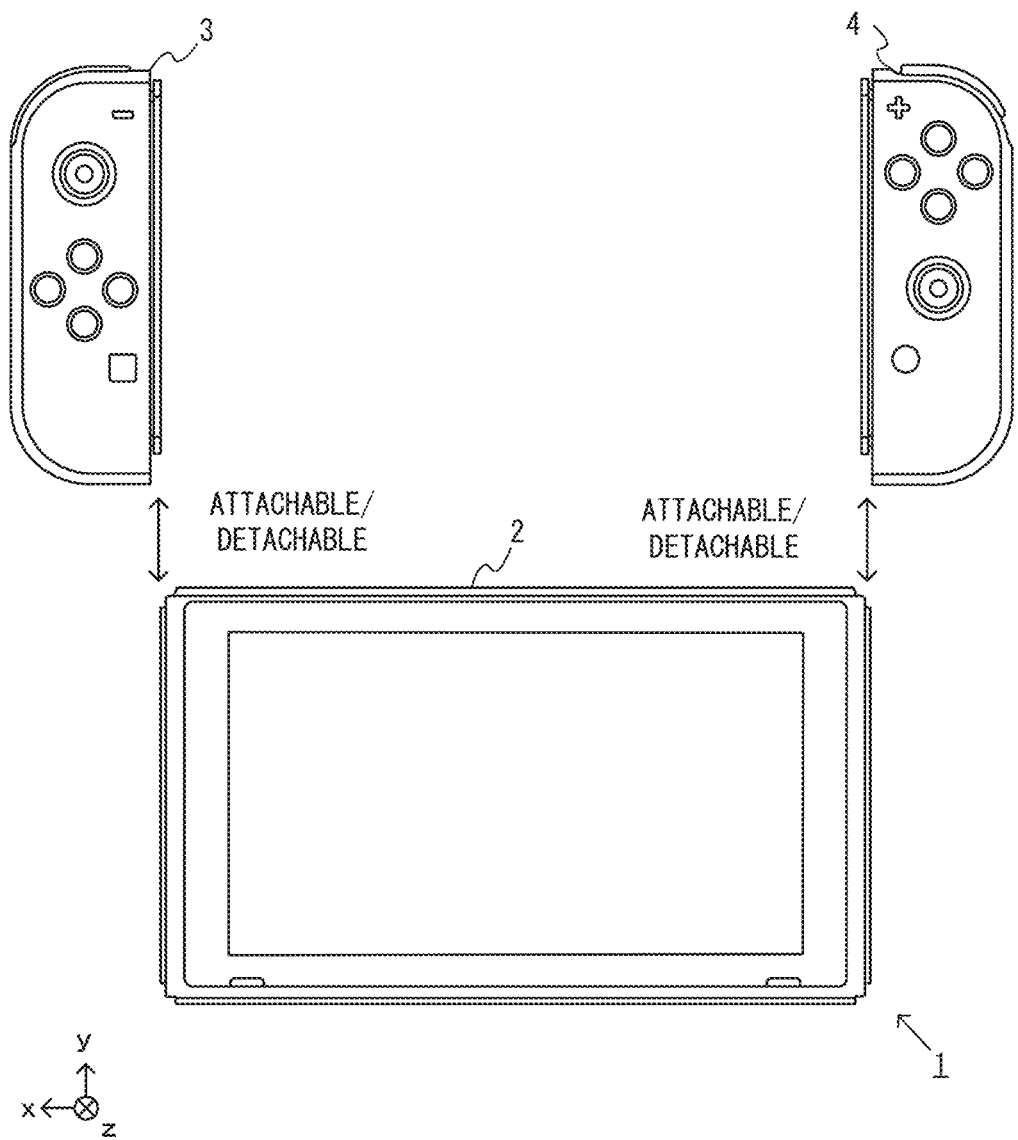
FIG. 2 is an illustration view showing a non-limiting example state where the left controller and the right controller are detached from the main body apparatus, respectively.

FIG. 2 is an illustration view showing an example of a state where the left controller 3 and the right controller 4 are detached from the main body apparatus 2, respectively. As shown in FIG. 1 and FIG. 2, each of the left controller 3 and the right controller 4 is attachable to and detachable from the main body apparatus 2. In addition, it should be noted that the left controller 3 and the right controller 4 may be referred to collectively as a "controller" in the following.

Figure 3:
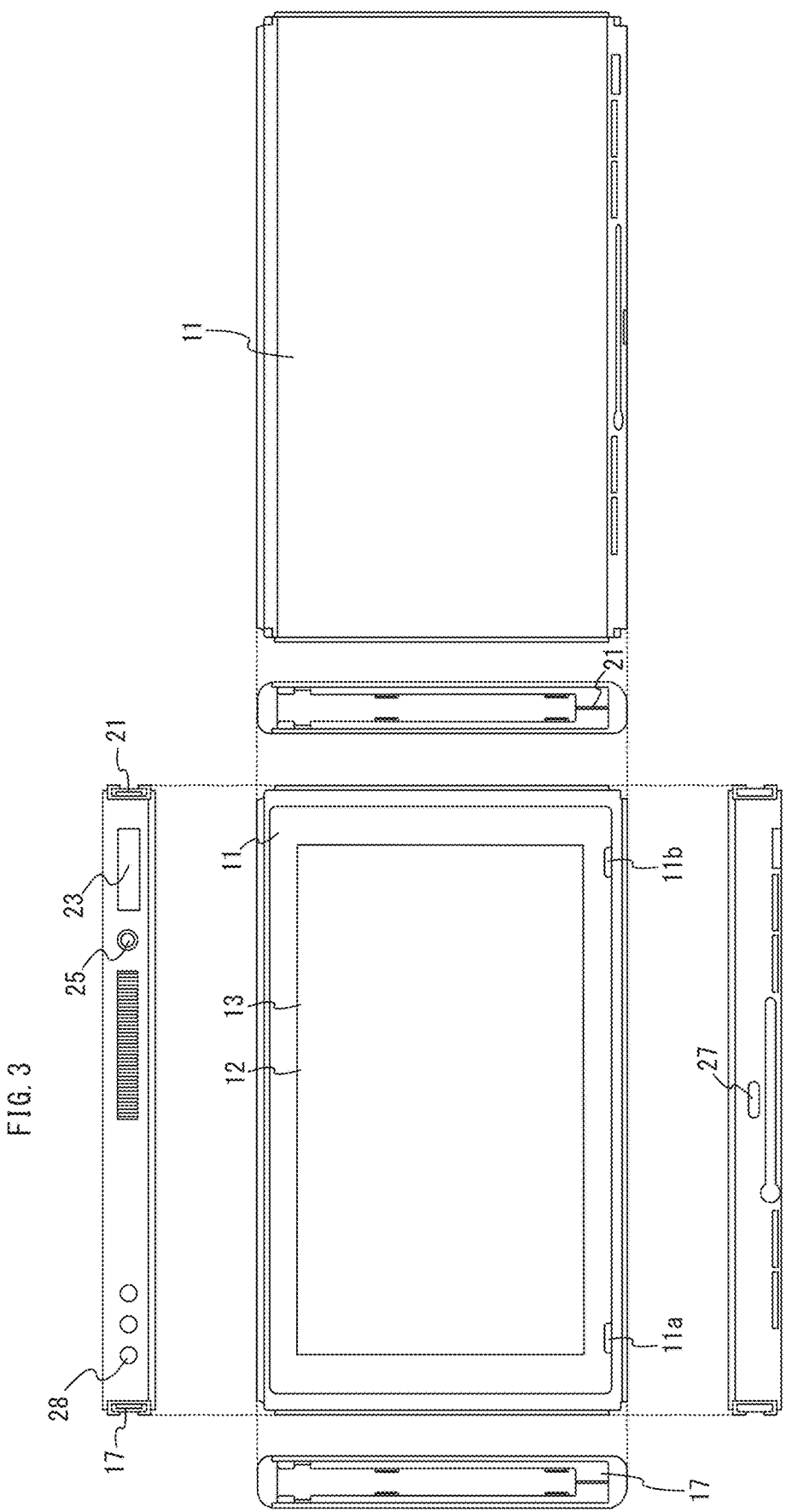
FIG. 3 is six orthogonal views showing a non-limiting example main body apparatus shown in FIG. 1 and FIG. 2.

FIG. 3 is six orthogonal views showing an example of the main body apparatus 2. As shown in FIG. 3, the main body apparatus 2 comprises a housing 11 having an approximately plate-shape. In this embodiment, a main surface (in other words, a surface on a front side, that is, a surface on which the display 12 is provided) of the housing 11 has a generally rectangular shape.

In addition, a shape and a size of the housing 11 are optional. As an example, the housing 11 may be of a portable size. Moreover, the main body apparatus 2 alone or the unified apparatus obtained by attaching the left controller 3 and the right controller 4 to the main body apparatus 2 may be a mobile apparatus. The main body apparatus 2 or the unified apparatus may be a handheld apparatus. The main body apparatus 2 or the unified apparatus may be a handheld apparatus or a portable apparatus.

As shown in FIG. 3, the main body apparatus 2 comprises the display 12 that is provided on the main surface of the housing 11. The display 12 displays an image generated by the main body apparatus 2. In this embodiment, the display 12 is a liquid crystal display device (LCD). However, the display 12 may be an arbitrary type display.

Moreover, the main body apparatus 2 comprises a touch panel 13 on a screen of the display 12. In this embodiment, the touch panel 13 is of a type that allows a multi-touch input (e.g., a capacitive type). However, the touch panel 13 may be of any type, and for example, the touch panel 13 may be of a type that allows a single-touch input (e.g., a resistive type).

The main body apparatus 2 includes speakers (i.e., speakers 88 shown in FIG. 6) within the housing 11. As shown in FIG. 3, speaker holes 11a and 11b are formed on the main surface of the housing 11. Then, sounds output from the speakers 88 are emitted through the speaker holes 11a and 11b.

Moreover, the main body apparatus 2 comprises a left terminal 17 that is a terminal for the main body apparatus 2 to perform wired communication with the left controller 3, and a right terminal 21 that is a terminal for the main body apparatus 2 performs wired communication with the right controller 4.

As shown in FIG. 3, the main body apparatus 2 comprises a slot 23. The slot 23 is provided on an upper side surface of the housing 11. The slot 23 has a shape to which a predetermined type of storage medium can be attached. The predetermined type of storage medium is, for example, a dedicated storage medium (e.g., a dedicated memory card) for the game system 1 or an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Moreover, the main body apparatus 2 comprises a power button 28.

The main body apparatus 2 comprises a lower terminal 27. The lower terminal 27 is a terminal through which the main body apparatus 2 performs communication with a cradle. In this embodiment, the lower terminal 27 is a USB connector (more specifically, a female connector). When the unified apparatus or the main body apparatus 2 alone is put on the cradle, the game system 1 can display on a stationary monitor an image generated by and output from the main body apparatus 2. Moreover, in this embodiment, the cradle has the function of charging the unified apparatus or the main body apparatus 2 alone that is put on the cradle. Moreover, the cradle has a function of a hub device (specifically, a USB hub).

Figure 4:
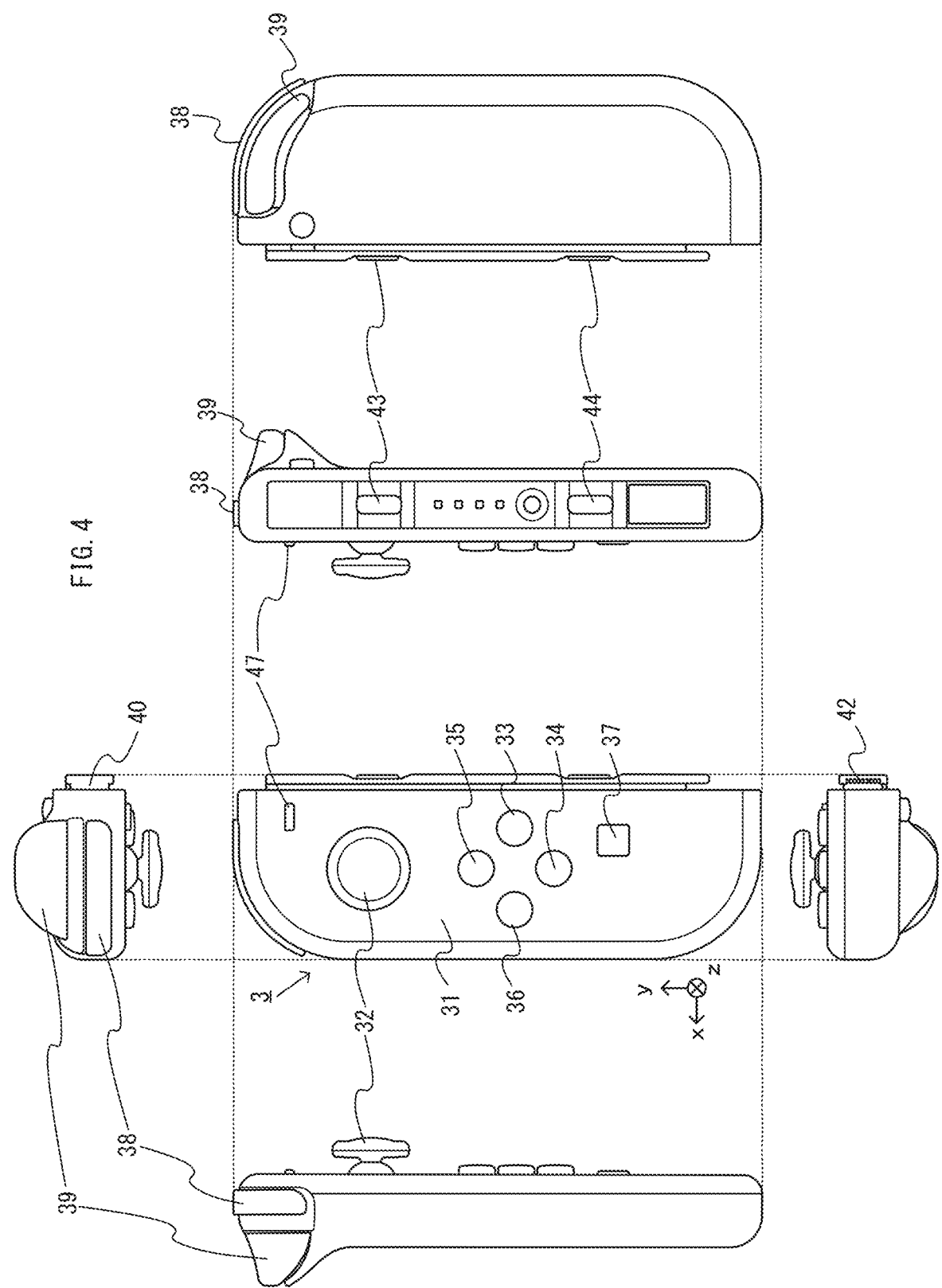
FIG. 4 is sixth orthogonal views showing a non-limiting example left controller shown in FIG. 1 and FIG. 2.

FIG. 4 is six orthogonal views showing an example of the left controller 3. As shown in FIG. 4, the left controller 3 comprises a housing 31. In this embodiment, the housing 31 has a vertically long shape, that is, is shaped to be long in an up-down direction (i.e., a y-axis direction shown in FIG. 1 and FIG. 4). In a state where the left controller 3 is detached from the main body apparatus 2, the left controller 3 can also be held in a direction that the left controller 3 is vertically long. The housing 31 has a shape and a size that when held in a direction that the housing 31 is vertically long, the housing 31 can be held with one hand, especially the left hand. Moreover, the left controller 3 can also be held in a direction that the left controller 3 is horizontally long. When held in the direction that the left controller 3 is horizontally long, the left controller 3 may be held with both hands.

The left controller 3 comprises an analog stick 32. As shown in FIG. 4, the analog stick 32 is provided on a main surface of the housing 31. The analog stick 32 can be used as a direction input section capable of inputting a direction. The user tilts the analog stick 32 and thereby can input a direction corresponding to a tilted direction (and input a magnitude corresponding to a tilted angle). In addition, the left controller 3 may comprise a cross key or a slide stick capable of performing a slide input, or the like as the direction input section, instead of the analog stick. Moreover, in this embodiment, it is possible to provide an input by pressing the analog stick 32.

The left controller 3 comprises various operation buttons. The left controller 3 comprises four (4) operation buttons 33-36 (specifically, a right direction button 33, a down direction button 34, an up direction button 35 and a left direction button 36) on the main surface of the housing 31. Furthermore, the left controller 3 comprises a record button 37 and a "−" (minus) button 47. The left controller 3 comprises an L-button 38 and a ZL-button 39 in an upper left portion of a side surface of the housing 31. Moreover, the left controller 3 comprises an SL-button 43 and an SR-button 44 on a surface at a side to be attached to the main body apparatus 2 out of side surfaces of the housing 31. These operation buttons are used to input instructions according to various programs (e.g., an OS program and an application program) executed by the main body apparatus 2.

Moreover, the left controller 3 comprises a terminal 42 for the left controller 3 to perform wired communication with the main body apparatus 2.

Figure 5:
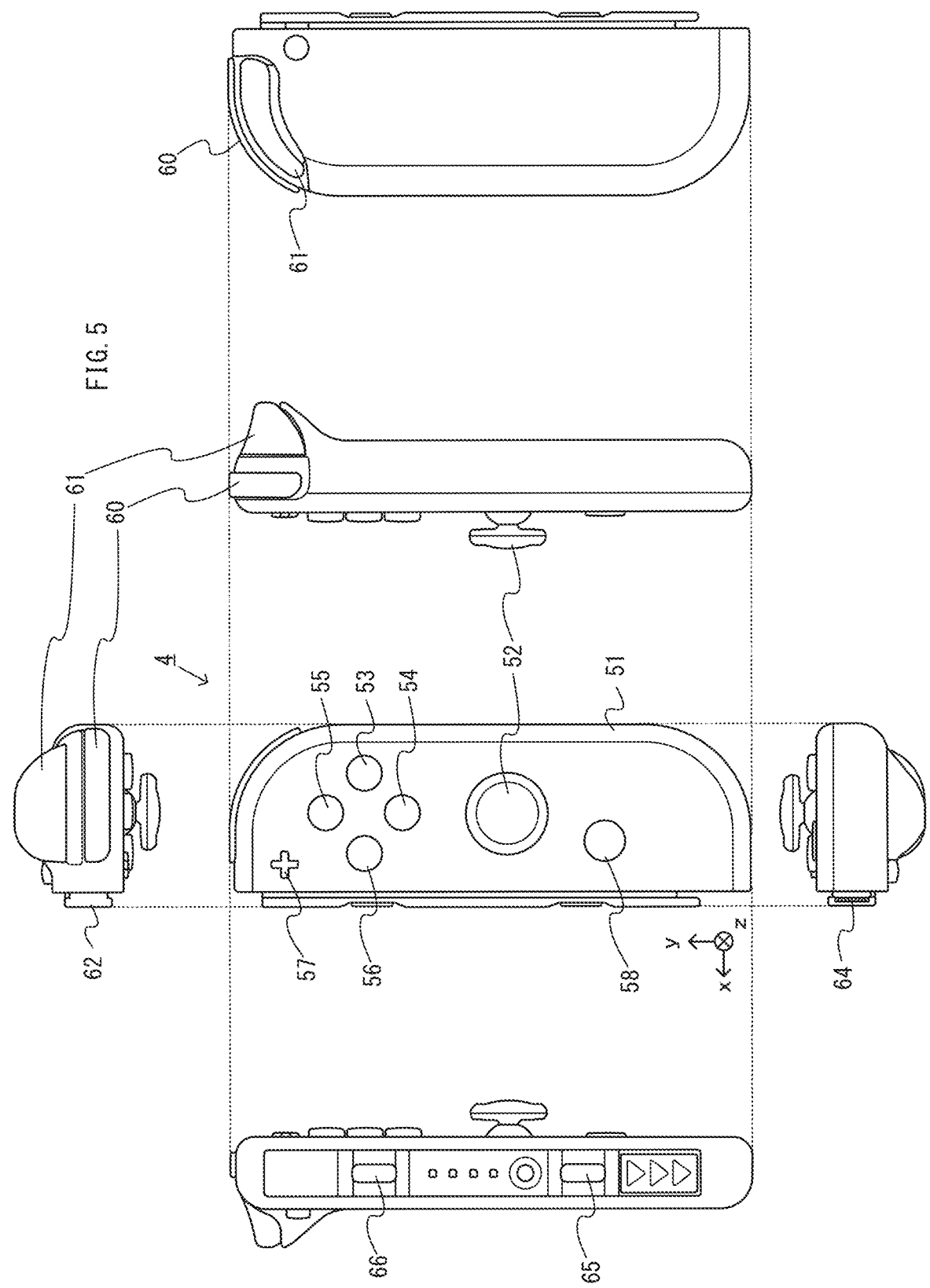
FIG. 5 is sixth orthogonal views showing a non-limiting example right controller shown in FIG. 1 and FIG. 2.

FIG. 5 is six orthogonal views showing an example of the right controller 4. As shown in FIG. 5, the right controller 4 comprises a housing 51. In this embodiment, the housing 51 has a vertically long shape, that is, a shape long in the up-down direction. In a state where the right controller 4 is detached from the main body apparatus 2, the right controller 4 can also be held in a direction that the right controller 4 is vertically long. The housing 51 has a shape and a size that when held in a direction that the housing 51 is vertically long, the housing 51 can be held with one hand, especially the right hand. Moreover, the right controller 4 can also be held in a direction that the right controller 4 is horizontally long. When held in the direction that the right controller 4 is horizontally long, the right controller 4 may be held with both hands.

Similar to the left controller 3, the right controller 4 comprises an analog stick 52 as a direction input section. In this embodiment, the analog stick 52 has the same configuration as that of the analog stick 32 of the left controller 3. Moreover, the right controller 4 may comprise a cross key or a slide stick capable of performing a slide input, or the like as the direction input section, instead of the analog stick. Moreover, similar to the left controller 3, the right controller 4 comprises four (4) operation buttons 53-56 (specifically, an A-button 53, a B-button 54, an X-button 55 and a Y-button 56) on the main surface of the housing 51. Furthermore, the right controller 4 comprises a "+" (plus) button 57 and a home button 58. Moreover, the right controller 4 comprises an R-button 60 and a ZR-button 61 in an upper right portion of a side surface of the housing 51. Moreover, similar to the left controller 3, the right controller 4 comprises an SL-button 65 and an SR-button 66.

Moreover, the right controller 4 comprises a terminal 64 for the right controller 4 to perform wired communication with the main body apparatus 2.

Figure 6:
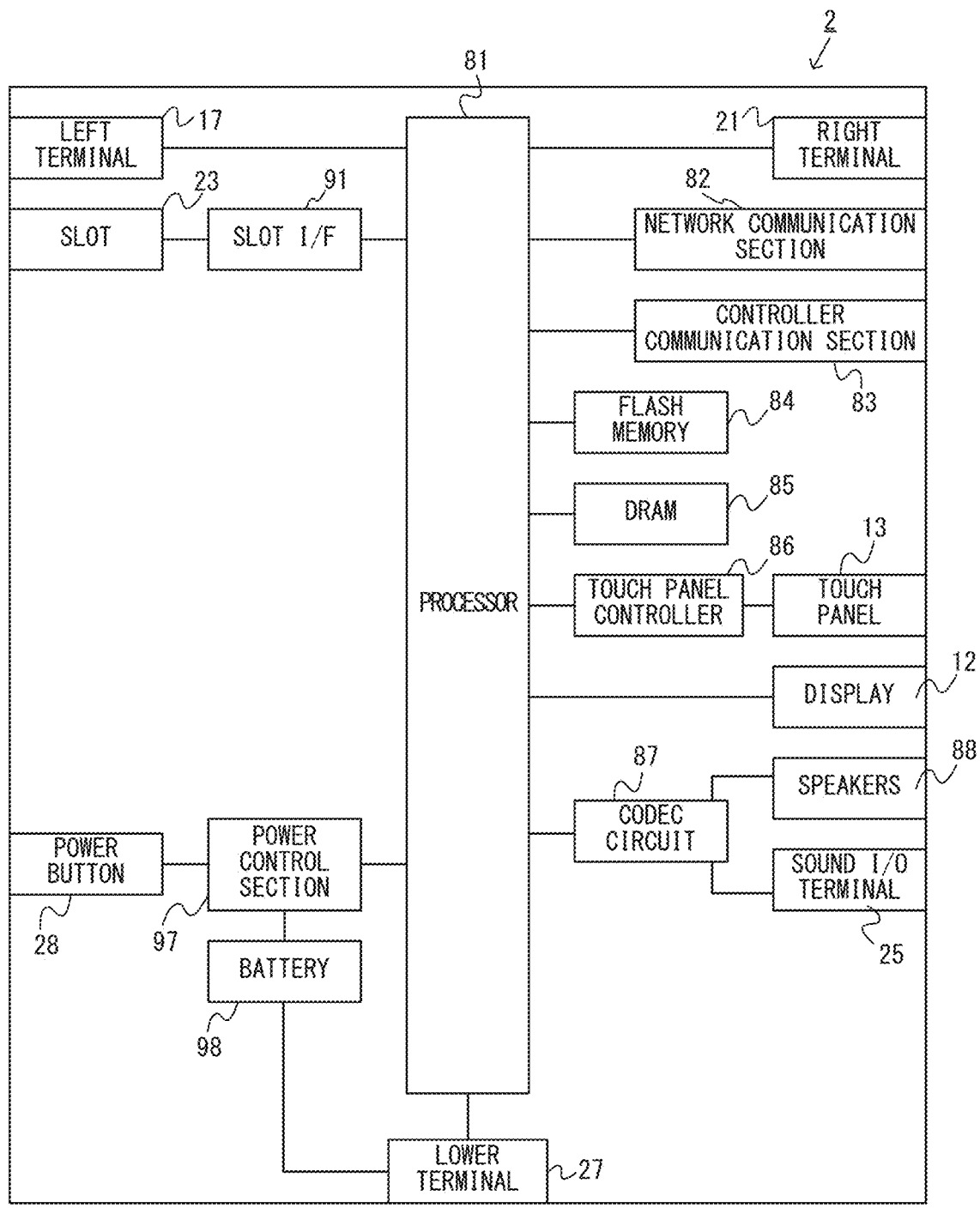
FIG. 6 is a block diagram showing a non-limiting example internal configuration of the main body apparatus shown in FIG. 1 and FIG. 2.

FIG. 6 is a block diagram showing an example of an internal configuration of the main body apparatus 2. The main body apparatus 2 comprises components 81-91, 97 and 98 shown in FIG. 6 in addition to components shown in FIG. 3. Some of the components 81-91, 97 and 98 may be mounted as electronic components on an electronic circuit board to be accommodated in the housing 11.

The main body apparatus 2 comprises a processor 81. The processor 81 is an information processing section that performs various types of information processing to be performed by the main body apparatus 2, and may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 comprises a flash memory 84 and a DRAM (Dynamic Random Access Memory) 85 as examples of internal storage media incorporated in the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 comprises a slot interface (hereinafter, abbreviated as "I/F") 91. The slot I/F 91 is connected to the processor 81. The slot I/F 91 is connected to the slot 23, and reads and writes, in accordance with instructions from the processor 81, data from and to the predetermined type of storage medium (e.g., a dedicated memory card) attached to the slot 23.

The processor 81 appropriately reads and writes data from and to the flash memory 84, the DRAM 85 and each of the above storage media, thereby performing the above-described information processing.

The main body apparatus 2 comprises a network communication section 82. The network communication section 82 is connected to the processor 81. The network communication section 82 performs communication (specifically, wireless communication) with external apparatus via a network. In this embodiment, as a first communication manner, the network communication section 82 is connected to a wireless LAN to perform communication with external apparatus by a system in conformity with the Wi-Fi standard. Moreover, as a second communication manner, the network communication section 82 performs wireless communication with a further main body apparatus 2 of the same type by a predetermined communication system (e.g., communication based on a unique protocol or infrared light communication). In addition, the wireless communication in the above-described second communication manner achieves a function of enabling so-called "local communication", in which the main body apparatus 2 can perform wireless communication with further main body apparatus 2 placed in a closed local network area, and a plurality of main body apparatus 2 perform communication directly with each other to transmit and receive data.

The main body apparatus 2 comprises a controller communication section 83. The controller communication section 83 is connected to the processor 81. The controller communication section 83 performs wireless communication with the left controller 3 and/or the right controller 4. Although communication system between the main body apparatus 2 and the left controller 3 and the right controller 4 is optional, in this embodiment, the controller communication section 83 performs communication with the left controller 3 and with the right controller 4 in conformity with Bluetooth (registered trademark) standard.

The processor 81 is connected to the left terminal 17, the right terminal 21 and the lower terminal 27. When performing wired communication with the left controller 3, the processor 81 transmits data to the left controller 3 via the left terminal 17 and receives (or acquires) operation data from the left controller 3 via the left terminal 17. Moreover, when performing wired communication with the right controller 4, the processor 81 transmits data to the right controller 4 via the right terminal 21 and receives (or acquires) operation data from the right controller 4 via the right terminal 21. Moreover, when performing communication with the cradle, the processor 81 transmits data to the cradle via the lower terminal 27. Thus, in this embodiment, the main body apparatus 2 can perform both wired communication and wireless communication with each of the left controller 3 and the right controller 4. Moreover, when the unified apparatus formed by attaching the left controller 3 and the right controller 4 to the main body apparatus 2 or the main body apparatus 2 alone is attached to the cradle, the main body apparatus 2 can output data (e.g., display image data and sound data) to the stationary monitor or the like via the cradle.

Here, the main body apparatus 2 can perform communication with a plurality of left controllers 3 simultaneously (in other words, in parallel). Moreover, the main body apparatus 2 can perform communication with a plurality of right controllers 4 simultaneously (in other words, in parallel). Therefore, a plurality of users can simultaneously provide inputs to the main body apparatus 2, each using a set of the left controller 3 and the right controller 4. As an example, a first user can provide an input to the main body apparatus 2 using a first set of the left controller 3 and the right controller 4, and simultaneously, a second user can provide an input to the main body apparatus 2 using a second set of the left controller 3 and the right controller 4.

The main body apparatus 2 comprises a touch panel controller 86 that is a circuit for controlling the touch panel 13. The touch panel controller 86 is connected between the touch panel 13 and the processor 81. Based on a signal from the touch panel 13, the touch panel controller 86 generates, for example, data indicating a position where a touch input is performed, and outputs the data to the processor 81.

Moreover, the display 12 is connected to the processor 81. The processor 81 displays a generated image (e.g., an image generated by performing the above information processing) and/or an externally acquired image on the display 12.

The main body apparatus 2 comprises a codec circuit 87 and speakers (specifically, a left speaker and a right speaker) 88. The codec circuit 87 is connected to the speakers 88 and a sound input/output (I/O) terminal 25 and also connected to the processor 81. The codec circuit 87 is a circuit for controlling an input/output of sound data to and from the speakers 88 and the sound input/output terminal 25.

The main body apparatus 2 comprises a power control section 97 and a battery 98. The power control section 97 is connected to the battery 98 and the processor 81. Moreover, although not shown in FIG. 6, the power control section 97 is connected to respective components of the main body apparatus 2 (specifically, components that receive power supplied from the battery 98, the left terminal 17 and the right terminal 21). Based on a command from the processor 81, the power control section 97 controls power supply from the battery 98 to the above-described components.

Moreover, the battery 98 is connected to the lower terminal 27. When an external charging device (e.g., a cradle) is connected to the lower terminal 27, and power is supplied to the main body apparatus 2 via the lower terminal 27, the battery 98 is charged with the supplied power.

Figure 7:
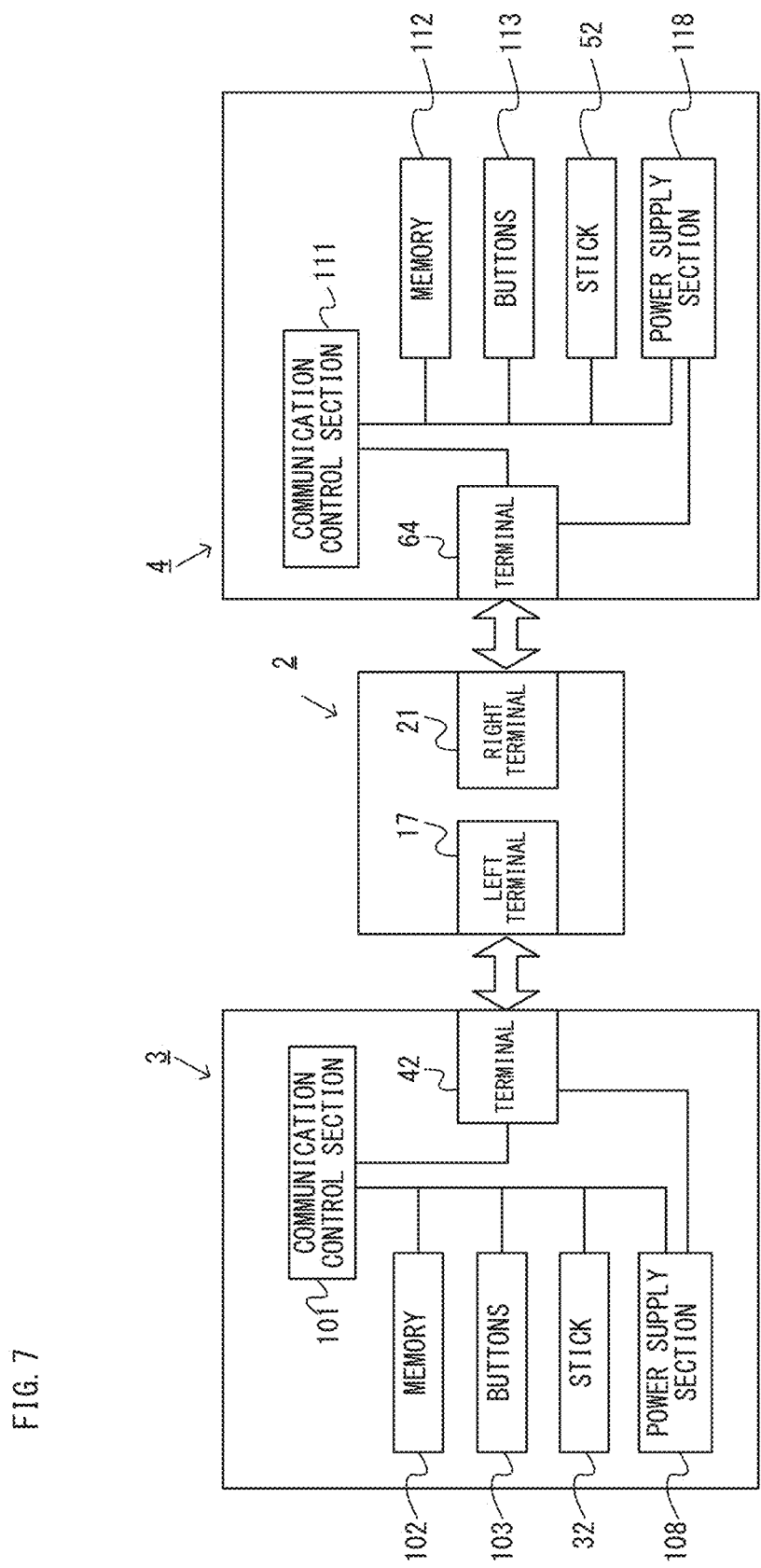
FIG. 7 is a block diagram showing non-limiting example internal configurations of the main body apparatus, the left controller and the right controller shown in FIG. 1 and FIG. 2.

FIG. 7 is a block diagram showing examples of internal configurations of the main body apparatus 2, the left controller 3 and the right controller 4. In addition, details of the internal configuration of the main body apparatus 2 are shown in FIG. 6 and thus are omitted in FIG. 7.

The left controller 3 comprises a communication control section 101 that performs communication with the main body apparatus 2. As shown in FIG. 7, the communication control section 101 is connected to components including the terminal 42. In this embodiment, the communication control section 101 can perform communication with the main body apparatus 2 through both wired communication via the terminal 42 and wireless communication not via the terminal 42. The communication control section 101 controls a method of performing communication by the left controller 3 with the main body apparatus 2. That is, when the left controller 3 is attached to the main body apparatus 2, the communication control section 101 performs communication with the main body apparatus 2 via the terminal 42. Moreover, when the left controller 3 is detached from the main body apparatus 2, the communication control section 101 performs wireless communication with the main body apparatus 2 (specifically, the controller communication section 83). The wireless communication between the communication control section 101 and the controller communication section 83 is performed in accordance with Bluetooth (registered trademark) standard, for example.

Moreover, the left controller 3 comprises a memory 102 such as a flash memory. The communication control section 101 is constituted by a microcomputer (also referred to as a microprocessor), for example, and executes firmware stored in the memory 102, thereby performing various processing.

The left controller 3 comprises buttons 103 (specifically, the buttons 33-39, 43, 44 and 47). Further, the left controller 3 comprises the analog stick (in FIG. 7, indicated as "stick") 32. The respective buttons 103 and the analog stick 32 outputs information regarding an operation performed to itself to the communication control section 101 repeatedly at appropriate timings.

The communication control section 101 acquires information regarding an input(s) (specifically, information regarding an operation or the detection results of the sensors) from respective input sections (specifically, the buttons 103, the analog stick 32 and the sensors 104 and 105). The communication control section 101 transmits operation data including the acquired information (or information obtained by performing predetermined processing on the acquired information) to the main body apparatus 2. In addition, the operation data is transmitted repeatedly, once every predetermined time period. In addition, the interval that the information regarding an input(s) is transmitted from each of the input sections to the main body apparatus 2 may or may not be the same.

The above-described operation data is transmitted to the main body apparatus 2, whereby the main body apparatus 2 can obtain an input(s) provided to the left controller 3. That is, the main body apparatus 2 can determine operations on the buttons 103 and the analog stick 32 based on the operation data.

The left controller 3 comprises a power supply section 108. In this embodiment, the power supply section 108 has a battery and a power control circuit. Although not shown, the power control circuit is connected to the battery and also connected to components of the left controller 3 (specifically, components that receive power supplied from the battery).

As shown in FIG. 7, the right controller 4 comprises a communication control section 111 that performs communication with the main body apparatus 2. Moreover, the right controller 4 comprises a memory 112 connected to the communication control section 111. The communication control section 111 is connected to components including the terminal 64. The communication control section 111 and the memory 112 have functions similar to those of the communication control section 101 and the memory 102, respectively, of the left controller 3. Therefore, the communication control section 111 can perform communication with the main body apparatus 2 through both wired communication via the terminal 64 and wireless communication not via the terminal 64 (specifically, communication in conformity with the Bluetooth (registered trademark) standard), and a method of communication to be performed with the main body apparatus 2 is controlled by the right controller 4.

The right controller 4 comprises input sections similar to the input sections of the left controller 3. Specifically, the right controller 4 comprises buttons 113 and the analog stick 52. These input sections have functions similar to those of the input sections of the left controller 3 and operate similarly to the input sections of the left controller 3.

The right controller 4 comprises a power supply section 118. The power supply section 118 has a function similar to the power supply section 108 of the left controller 3, and operates similarly to the power supply section 108.

Figure 8:
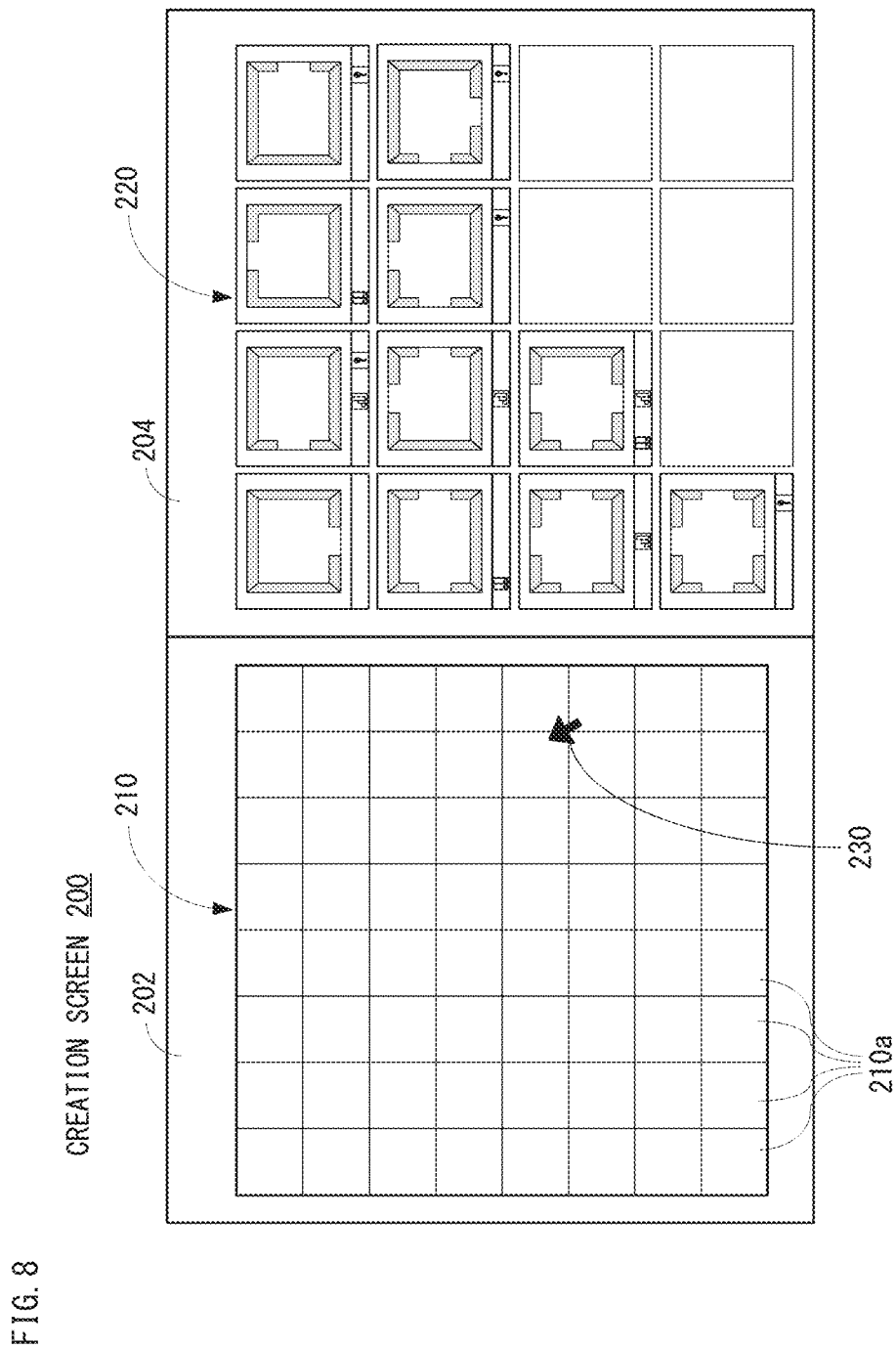
FIG. 8 is a view showing a non-limiting first example creation screen of a game stage.

Next, with reference to FIG. 8-FIG. 19, an outline of game processing of a virtual game executable in the game system 1 according to this embodiment will be described. FIG. 8 is an illustration view showing a non-limiting first example game image displayed on a display (for example, the display 12) when an application of the virtual game of this embodiment is executed.

The main body apparatus 2 functions also as an image processing apparatus, and generates and outputs (displays) display image data corresponding to various screens such as a game image. The processor 81 arranges various kinds of objects and characters in a three-dimensional virtual space, thereby generating a certain sight or scene. An image imaged this scene by a virtual camera (an image viewed from a viewpoint) is displayed on the display 12 as a game image.

FIG. 8 is a view showing a non-limiting example creation screen 200 for creating a game stage, which includes an area 202 for creating a game stage that is for playing a game (hereinafter, referred to as "creation area"), and an area 204 for selecting a component (corresponding to "game component") being a source of the game stage (hereinafter, referred to as "selection area"). The creation area 202 includes an area 210 for arranging the component 220 (hereinafter, referred to as "arrangement area"), and the arrangement area 210 is divided into a grid pattern. In each of grids 210*a* constituting the arrangement area 210, the component 220 can be located or arranged by one (1).

The component 220 corresponds to a virtual room formed in a three-dimensional virtual space, and is shown by a two-dimensional image. The component 220 may be prepared in advance in the game, or acquired by playing a game (for example, a main part of game) different from a game played in the game stage (for example, a mini game), or downloaded from a network such as an internet in some cases.

Figure 9:
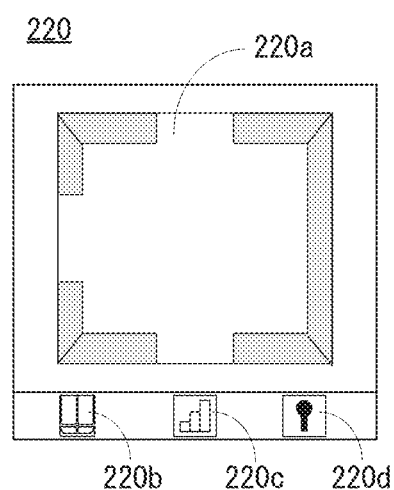
FIG. 9 is a view showing non-limiting example component to be selected at the time of creating the game stage.

FIG. 9 shows a non-limiting example component 220. As shown in FIG. 9, a reduced image 220*a* of a two-dimensional image when viewing the virtual room corresponding to the component 220 from above the virtual space is drawn on a surface of the component 220. However, the reduced image 220*a* may be simplified. The virtual room has a rectangular parallelepiped shape in the three-dimensional virtual space, and is a rectangular shape (horizontally long rectangle in this embodiment) when viewing the virtual space from the above. A passage (or doorway) is provided in at least one of the four walls constituting the virtual room, whereby the virtual room can be coupled (connected) to another virtual room. However, in other embodiments, the component 220 may be a simple passage not be a virtual room. That is, the component 220 expresses at least one of a virtual room and a passage.

In the following, in the creation screen 200, when describing with using a direction, a term "up", "down", "left" or "right" at the time of viewing the creation screen 200 from the front will be used.

In this embodiment, when the virtual room is viewed from the above, four walls are provided in the up, down, left and right directions. Moreover, the type of the virtual room is various, not only one (1) but two, three or four passages may be provided. Except for a case where four passages are provided, it is possible to classify the virtual room according to the number of the passages and positions of the walls provided with a passage. When the virtual room has a single passage, a wall in the up, down, left or right direction is provided with the passage, thereby to classify into four types. Moreover, when the virtual room has two passages, walls each provided with the passage can be provided in the up and down directions, the left and right directions, the up and left directions, the up and right directions, the down and left directions, or the down and right directions, thereby to classify into six types. Furthermore, when the virtual room has three passages, walls each provided with the passage can be provided in the up, down and left directions, the up, down and right directions, the up, left and right directions, or the down, left and right directions, thereby to classify into four types.

Although detailed description is omitted, when creating a game stage, it is possible to select a desired arrangement area 210 out of a plurality of types of arrangement areas 210. Although it is possible to arrange the panel 212 on an arbitrary grid 210*a* in the arrangement area 210 in an example shown in FIG. 8, in other examples, in some case, the panel 212 cannot be arranged on some grids 210*a*.

At this time, passages are connected to each other when the passages are in contact with each other in two adjacent panels 212. Moreover, when a stairs is arranged in the panel 212, the stairs is connected to a stairs arranged in another panel. In this case, the virtual rooms in each of which the stairs is arranged do not have to be adjoined to each other. That is, the stairs is a special transfer element that can connect the virtual rooms that cannot be connected to each other. For example, two stairs are connected to each other via a passage provided underground or in the air, or are connected so as to warp. However, when three or more panels 212 each having the stairs are arranged, two stairs that a two-dimensional distance therebetween in the arrangement area 210 of the creation screen 200 becomes shortest are connected to each other.

In this embodiment, position information of the stairs (for example, two-dimensional position coordinate) is associated with the panel 212 arranged in the arrangement area 210. This position information is calculated when the panel 212 corresponding to the component 220 of this virtual room is arranged in the arrangement area 210 based on the position of the stairs in the virtual room (local position). However, the two-dimensional position coordinate of the stairs may be position coordinate of an image 212c of the stairs (see FIG. 11B) displayed on the upper right of the panel 212.

Moreover, a method of connecting the stairs to each other is a mere example, and it should not need to be limited. In other examples, the stairs selected at random or the stairs selected manually by a player may be connected to each other.

Moreover, below the reduced image 220a, information on an object arranged in the virtual room is shown as a two-dimensional image. In this embodiment, the object arranged in the virtual room is an object imitating a treasure chest, an object imitating stairs provided in the virtual room and an object imitating a door with lock (hereinafter, referred to as "locked door") that is provided in the virtual room and blocks the passage.

In an example shown in FIG. 9, when the object imitating the treasure chest is arranged in the virtual room, an image 220b of the treasure chest is displayed in the left below the reduced image 220a. Moreover, when the object imitating the stairs is arranged in the virtual room, an image 220c of the stairs is displayed below the reduced image 220a. Furthermore, when the object imitating a locked door that blocks the passage is arranged in the virtual room, an image 220d of a keyhole is displayed in the right below the reduced image 220a. However, the image 220c of the stairs is displayed between the image 220b of the treasure chest and the image 220d of the keyhole in the component 220. Moreover, if a plurality of locked doors exist in the virtual room, the number thereof is displayed beside (for example, right side) the image 220d of the keyhole.

Although FIG. 9 is illustrated in a case where all the images 220b, 220c and 220d are displayed for convenience of description, when no object corresponding to them is arranged in the virtual room, the images 220b, 220c and 220d are not displayed.

Returning to FIG. 8, a designation image 230 is further displayed in the creation screen 200, and it is possible to designate (or select) the component 220 by moving this designation image 230, and the grid 210a can be designated (selected) by the designation image 230. For example, the designation image 230 is moved on the creation screen 200 using the analog stick 32. However, the designation image 230 can also be moved on the creation screen 200 using the right direction button 33, the down direction button 34, the up direction button 35 and the left direction button 36.

When arranging the desired component 220 into the arrangement area 210, a user or player (hereinafter, simply referred to as "player") moves the designation image 230 with the analog stick 32 so as to designate the component 220 displayed in the selected area 204, and depresses the A button 53. Then, arranging the component 220 designated by the designation image 230 into the arrangement area 210 is determined. Then, the player moves the designation image 230 with the analog stick 32 to designate a desired grid 210a in the arrangement area 210, and depresses the A button 53. Then, the panel 212 corresponding to the component 220 having been determined to be arranged is arranged (or displayed) onto the designated grid (that is, arrangement destination) 210a.

However, before determining the component 220 to be arranged, the grid 210a of arrangement destination may be designated (or determined). In such a case, if the component 220 to be arranged is determined, the panel 212 corresponding to the determined component 220 is arranged on the grid 210a of the arrangement destination having been determined previously.

Figure 10:
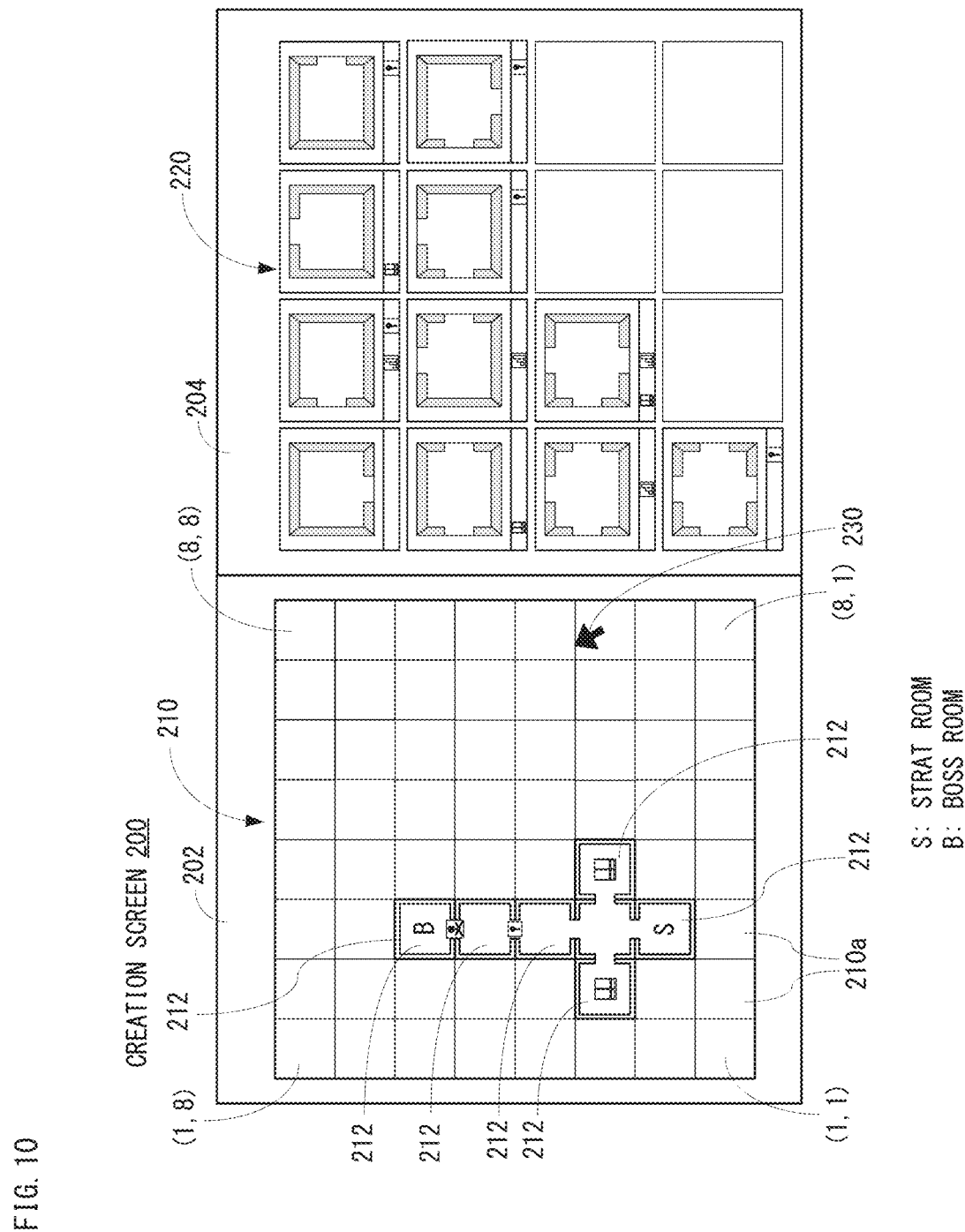
FIG. 10 is a view showing a non-limiting second example creation screen of a game stage.

FIG. 10 shows a non-limiting example state where a plurality of components 220 are arranged on a plurality of grids 210a in the arrangement area 210. As shown in FIG. 10, the panel 212 corresponding to the component 220 of the virtual room including an initial position (hereinafter, referred to as "start room S") and the panel 212 corresponding to the component 220 of the virtual room that is a specific position or place where a boss enemy object exists (hereinafter, referred to as "boss room B") are arranged in the arrangement area 210, and one or more panels 212 respectively corresponding to the components 220 for one or more virtual rooms other than the above-described two rooms are arranged between the start room S and the boss room B. In the example shown in FIG. 10, five panels 212 corresponding to the components 220 corresponding to the virtual rooms other than the above-described two rooms.

In this specification, "the panel 212 corresponding to the component 220 of the virtual room" is referred to as "the panel 212 corresponding to the virtual room".

As shown in FIG. 10, in this embodiment, a letter of "S" is drawn in the panel 212 corresponding to the start room S, and a letter of "B" is drawn in the panel 212 corresponding to the boss room B. However, this is an example, symbols may be drawn instead of the letters. Moreover, in the following, "virtual room other than the above-described two rooms" is referred to as "normal room". The word "virtual room" is used when there is no necessity of distinguishing the start room S, the boss room B and the normal room.

Figure 11A:
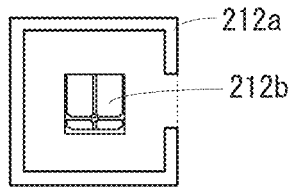
FIG. 11A is a view showing a non-limiting example panel to be arranged in an arrangement area at the time of creating the game stage.

Moreover, as shown in FIG. 11A, a frame-like image 212a indicative of a wall and a passage, and an image 212b of the treasure chest are displayed on the panel 212 corresponding to the virtual room provided with the treasure chest. As shown in FIG. 11A, the image 212a is shown by a thick frame along an outline of the panel 212. Although the outline of the panel 212 is transparent, in FIG. 11A, in order to indicate intelligibly, the outline of the panel 212 is indicated by a dotted line in a portion where the passage is arranged. This is the same in FIG. 11B and FIG. 11C. Although detailed description is omitted, as understood by comparing the panel 212 of FIG. 11A and the panel 212 of FIG. 11C with each other, a shape or form of the image 212a changes according to the number and position of the passages. Moreover, as shown in FIG. 11A, the image 212b is drawn (or displayed) in the central portion of the panel 212.

Figure 11B:
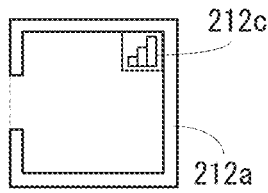
FIG. 11B is a view showing non-limiting another example panel to be arranged in the arrangement area at the time of creating the game stage.

As shown in FIG. 11B, the image 212a and the image 212c of the stairs are displayed on the panel 212 corresponding to the virtual room provided with the stairs. The image 212c is drawn (displayed) at the upper right in the panel 212.

Figure 11C:
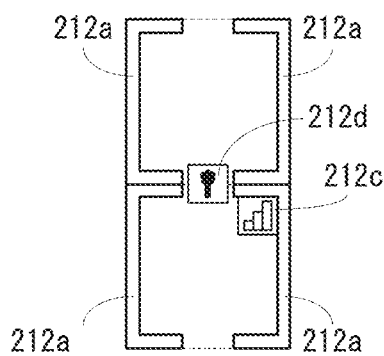
FIG. 11C is a view showing a non-limiting example locked door provided in a passage between adjacent two panels that are panels to be arranged in the arrangement area at the time of creating the game stage.

As shown in FIG. 11C, the image 212d of the keyhole is drawn (or displayed) in the panel 212 corresponding to the virtual room provided with the locked door so as to extend over the passage provided with the locked door and the passage in the panel 212 corresponding to the adjacent virtual room.

As shown in the arrangement area 210 of FIG. 10, the locked door provided in the passage of the boss room B (hereinafter, may be referred to as "boss locked door") is different from the locked door provided in the passage of the normal room (corresponding to a second prohibition element). Therefore, the boss locked door (corresponding to a first prohibition element) can be released by a key (hereinafter, referred to as "boss key" (corresponding to a first release element)) that is different from a key (corresponding to a second release element) capable of releasing the locked door provided in the passage of the normal room.

Figure 11D:
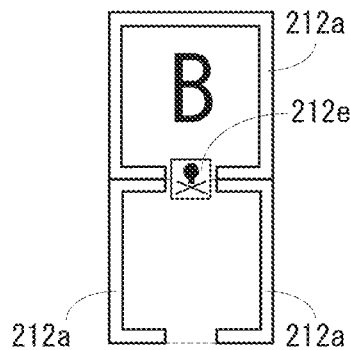
FIG. 11D is a view showing a non-limiting example boss locked door provided in a passage between adjacent two panels that are panels to be arranged in the arrangement area at the time of creating the game stage.

In order to express difference between these keys, as shown in FIG. 11D, an image 212e of a keyhole corresponding to the boss locked door provided in the passage of the boss room B is made to have a pattern different from a pattern of the image 212d of the keyhole corresponding to the locked door provided in the passage of the normal room. In the following, when there is no necessity of distinguishing the boss locked door and the boss key from the locked door provided in the passage of the normal room and the key, simply referred to as "locked door" and "key".

Although illustration is omitted, as described above, the virtual room may be provided with two or more out of the treasure chest, the stairs and the locked door, and in such a case, two or more out of the images 212b, 212c and 212d are displayed on the panel 212 corresponding to the virtual room. Moreover, when two or more locked doors are provided in the virtual room, two or more images 212d are displayed on the panel 212 corresponding to the virtual room. However, the image 212d of the keyhole is displayed in a position corresponding to the passage provided with the locked door.

In this embodiment, it is possible to actually play the game stage that the player creates. However, when the game stage is created not correctly, it is impossible to play it. That is, the player can create the game stage for playing the game. Conditions that the game stage is correctly created are (1) that the panel 212 corresponding to the start room S and the panel 212 corresponding to the boss room B are arranged, that is, that the initial position of the player object and the specific position are set, (2) that the passages and the stairs of the virtual rooms are all connected, and (3) that the treasure chests as many as the number of locked doors or more are arranged. The conditions (1)-(3) are preconditions that the game stage is correctly created, and it is determined whether the game can be cleared in consideration of the positions of the locked doors and the treasure chests on the assumption satisfying these preconditions. That is, it is necessary to satisfy also a condition (4) that the game can be cleared.

In this embodiment, the key for releasing the locked door is contained in the treasure chest. However, the key and the locked door are not associated with each other, and the locked door can be released with any key. Moreover, the key used for releasing the locked door is consumed, and is lost. Therefore, as described above, the preconditions include the condition (3). Moreover, in this embodiment, although a key of the boss room B is also contained in the treasure chest, the key of the boss room B is obtained (or acquired) at the last. However, if the number of the treasure chests is larger than the number of the locked doors, more keys are not required, and therefore, an item other than the key will be obtained, or none will be obtained (that is, the treasure chest is empty). For example, when two extra treasure chests are arranged, no key can be obtained from the treasure chests that are opened firstly and secondly, respectively.

Thus, the key, which is the release element that allows the player object to pass through by releasing the locked door that is a prohibition element that the player object cannot pass through, is in the treasure chest. When there are more treasure chests than the number of the locked doors, there is a case where the key is not contained in the treasure chest, and therefore, it is possible to consider that the treasure chest is a potential release element with a possibility of obtaining the key that is the release element.

Moreover, a game cannot be cleared unless the game stage is created so that the key can be obtained prior to the virtual room that the locked door is arranged, even if the preconditions (1)-(3) can be satisfied.

However, in this embodiment, it is necessary to defeat the boss enemy object in order to clear the game, and for that purpose, the player object needs to arrive at the boss room B. Therefore, a condition that the game can be cleared in the game stage is that the player object can arrive at the boss room B.

Since it is necessary to determine whether the game stage is created correctly, in this embodiment, information that is set to the virtual room (hereinafter "set information") is associated with the component 220 corresponding to the virtual room. The set information is information for generating (or drawing) the virtual room in the three-dimensional virtual space. However, information required to determine whether the game stage is created correctly is a part of information included in the set information, and specifically, a type of room, a position (and direction) for each passage, a position of the stairs, a position of the treasure chest and a position (and direction) for each locked door correspond. However, the type of room is the start room S, the boss room B or the normal room. When the stairs is not arranged in the virtual room, the position of the stairs is not included in the set information. When the treasure chest is not arranged in the virtual room, the position of the treasure chest is not included in the set information. When the locked door is not arranged in the virtual room, the position for each locked door is not included in the set information.

In addition, each of the above-described positions is a position in the virtual room (that is, local position), and converted into a position in the three-dimensional virtual space when creating the game stage in the three-dimensional virtual space.

When determining whether the game stage is correctly created using a plurality of panels 212 arranged in the arrangement area 210, the set information associated with the component 220 corresponding to each panel 212 is referred to. Moreover, since two stairs having the shortest two-dimensional distance therebetween are connected to each other in the arrangement area 210 as described above, as for the virtual room having the stairs, the position of the stairs in the arrangement area 210 (that is, the two-dimensional position coordinate) is calculated when the panel 212 corresponding to the component 220 is arranged in the arrangement area 210, thereby to calculate the distance between the two stairs.

Moreover, as shown in FIG. 10, information indicative of the arranged position (hereinafter, referred to as "positional information") is associated to each of the plurality of panels 212. In this embodiment, the arrangement area 210 has eight grids 210a arranged in the vertical direction and eight grids 210a arranged in the horizontal direction, and the positional information is managed for each grid. For example, the grid 210a at the down left corner of the arrangement area 210 is set as the reference grid 210a, and the positional information of this reference grid 210a is set as (1, 1). With respect to the positional information, a left element is incremented by 1 (one) if deviated rightward by 1 (one) from the reference grid 210a, and a right element is incremented by 1 (one) if deviated upward by 1 (one) from the reference grid 210a. Therefore, the positional information of the grid 210a at the up right corner is (8, 8). Moreover, in the example shown in FIG. 10, the positional information of the panel 212 corresponding to the start room S is (3, 2), and the positional information of the panel 212 corresponding to the boss room B is (3, 6). Although description is omitted, the positional information of other panels 212 are also the same.

When determining whether the preconditions (1)-(3) are satisfied, it is determined whether the passages and stairs are all connected, and whether the number of the treasure chests is equal to or larger than the number of the locked doors, by referring to the positional information of the panel 212 and a part of information included in the set information of the component 220 corresponding to the panel 212.

Moreover, when satisfying the preconditions (1)-(3), it is determined whether the game stage can be cleared. As described later, clear-possibility determination processing (see FIG. 24) is executed. In the clear-possibility determination processing, route search processing (see FIG. 25) is executed from the start room S in the created game stage to search a route within a range that the player object can arrive at from the start room S without releasing the locked door. As a result, it is evaluated whether all the treasure chests can be opened and thus the game stage can be cleared (that is, the route search is successful), or whether there becomes not enough keys and thus the game stage cannot be cleared (that is, the route search is failure).

However, when the key remains, only one (1) locked door is released, and the route search processing is executed from the virtual room beyond the locked door having being released. Moreover, when there are a plurality of locked doors, the route search processing is executed for each of all combinations of the locked doors.

In the route search processing, room information acquisition processing (see FIG. 26 and FIG. 27) is executed, whereby room information on the specified virtual room can be acquired. In this embodiment, the room information is a part of information of route search information, and includes arrival check information of the room and discovery information of the locked door.

Here, the route search information includes the arrival check information of the room, the discovery information of the locked door, released/locked information, the number of the opened treasure chests and the number of the keys being possessed. However, the arrival check information of the room is information indicating whether each virtual room constituting the game stage has been checked for arrival (that is, TRUE/FALSE). The discovery information of the locked door is information indicating whether the locked door is arranged in each of the directions of each virtual room (that is, TRUE/FALSE). The released/locked information is information indicating whether the locked door is released (that is, TRUE/FALSE).

In the room information acquisition processing, if the treasure chest exists in the start room S, the treasure chest is opened. If a condition that a key comes out this treasure chest is set, one (1) key is obtained. However, if all the treasure chests have been opened, this indicates a success, and the route search thereafter becomes unnecessary, thereby to terminate the clear-possibility determination processing.

In the room information acquisition processing, connection of the room for each of the up, down, left and right directions in a specified virtual room is confirmed, and if the passage exists, the room information acquisition processing for the virtual room beyond the passage is further executed.

Here, the route search processing in the game stage created in the arrangement area 210 of the creation screen 200 shown in FIG. 10 is briefly described. A range capable of advancing from the start room S in the game stage shown in FIG. 10 without releasing the locked door is the virtual rooms corresponding to the panels arranged at (2, 3), (3, 3), (3, 4) and (4, 3). As a result of executing the route search in this game stage, it is possible to open the treasure chest for each of the virtual rooms corresponding to the panels 212 arranged at (2, 3) and (4, 3). Since the number of the treasure chests is two in total in the game stage shown in FIG. 10, all the treasure chests can be opened. Being able to open all the treasure chests means that all the keys can be obtained, and thus, this game stage can be cleared.

FIG. 12 shows another non-limiting example creation screen 200. In FIG. 12, the grid 210a applied with slant lines is a grid 210a that the panel 212 cannot be arranged (that is, a grid outside the arrangement range). In the example shown in FIG. 12, with respect to the arrangement area 210, it is impossible to arrange the panel 212 in five grids 210a arranged in an L-letter shape to surround four upper right grids 210a. That is, the grid 210a that the panel 212 can be arranged is restricted.

Therefore, in order to couple two virtual rooms sandwiching the grid 210a outside the arrangement range to each other, stairs need to be arranged in each of the two virtual rooms. In the game stage created in the arrangement area 210 of the creation screen 200 shown in FIG. 12, the stairs provided in the virtual room corresponding to the panel 212 arranged at (3, 4) and the stairs provided in the virtual room corresponding to the panel 212 arranged at (7, 7) shall be coupled to each other. This is the same for FIG. 13 and FIG. 14.

Here, the route search processing in the game stage shown in FIG. 12 is briefly described. In the game stage shown in FIG. 12, a range capable of advancing from the start room S without releasing the locked door is up to the virtual rooms corresponding to the panels 212 arranged at (2, 3), (3, 3), (3, 4), (4, 3), (5, 3), (6, 3) and (7, 7). As a result of executing the route search in this game stage, it is possible to open the treasure chest in each of the virtual rooms corresponding to the panels 212 arranged at (2, 3) and (4, 3). Since the number of the treasure chests is three in total in the game stage shown in FIG. 12, the game stage cannot be cleared at this point.

Here, when the key remains, only one (1) locked door is released, and the route search processing is executed from the virtual room beyond the locked door having being released. In this case, the route search processing is started from the room beyond the locked door having being released (for convenience of description, referred to as "re-start room"). In this route search processing is executed for a range capable of advancing without releasing the locked door from the re-start room.

In the example shown in FIG. 12, two keys are obtained in the above-described route search processing. Therefore, the route search processing is executed in a case where the locked door between the panel 212 arranged at (3, 4) and the panel 212 arranged at (3, 5) is released and in a case where the locked door between the panel 212 arranged at (7, 7) and the panel 212 arranged at (7, 8) is released, respectively. In the example shown in FIG. 12, in a case where the locked door between the panel 212 arranged at (3, 4) and the panel 212 arranged at (3, 5) is released, it is possible to advance to the virtual room corresponding to the panel 212 arranged at (3, 5), but there is no treasure chest in this virtual room.

On the other hand, in a case where the locked door between the panel 212 arranged at (7, 7) and the panel 212 arranged at (7, 8) is released, it is possible to advance to the virtual room corresponding to the panels 212 arranged at (7, 8) and (8, 8), and it is possible to open the treasure chest in the virtual room corresponding to the panel 212 arranged at (8, 8). That is, since all the treasure chests can be opened, the game stage can be cleared.

Moreover, when executing the clear-possibility determination processing, a background color of the panel 212 in the creation screen 200 is changed based on a determination result. As an example, at the beginning of creating the game stage, the background color of all the panels 212 is gray. If the clear-possibility determination processing is executed, the background color of the panel 212 corresponding to the virtual room that the player object 302 can arrive at is made blue, and the background color of the panel 212 corresponding to the virtual room that the player object 302 cannot arrive at is made red. It is possible to know from the arrival check information of the room included in the route search information whether the room is a virtual room that the player object 302 can arrive at or whether a virtual room that the player object 302 cannot arrive at. However, when the game stage can be cleared, it is possible to arrive at all the virtual rooms even without referring to the arrival check information of the room.

Since the game stage shown in FIG. 10 and FIG. 12 can be cleared as described above, the player object 302 can arrive at all the rooms. Therefore, the background color of all the panels 212 constituting the game stage shown in FIG. 10 and FIG. 12 is made blue.

After the clear-possibility determination processing is executed once, when the panel 212 is arranged, the panel 212 is removed or the panel 212 is moved, it is determined whether the preconditions are satisfied. If the preconditions are satisfied, the clear-possibility determination processing is executed, and the background color of respective panels 212 constituting the game stage is updated based on the determination result. However, when not satisfying the preconditions, based on a determination result of the last clear-possibility determination processing and the precondition(s) not being satisfied, the background color of respective panels 212 constituting the game stage is updated.

FIG. 13 shows a further non-limiting example creation screen 200. The creation screen 200 shown in FIG. 13 is a screen that the panel 212 arranged at a position of (6, 3) is moved to a position of (7, 3), for example in the creation screen 200 shown in FIG. 12. In the creation screen 200 shown in FIG. 12, since the game stage is created accuracy, the background color of all the panels 212 constituting the game stage is made blue. However, as described above, since the passage of the panel 212 arranged at the position of (5, 3) and the passage of the panel 212 arranged at the position of (7, 3) are not connected to each other in the creation screen 200 of FIG. 13 that the panel 212 is moved, the background color of the two panels 212 is made red. This is a result of the clear-possibility determination processing immediately before and a result of updating (or determining) the background color of each panel 212 based on the precondition that is no longer satisfied due to the movement of the panel 212.

In FIG. 13, it is indicated by a horizontally striped pattern that the background color of the panel 212 is red. Moreover, it is indicated by not applying the horizontally striped pattern that the background color of the panel 212 is blue.

Although the background color of the panel 212 is changed in this embodiment, this is a mere example, it should not need to be limited. In other embodiments, the color of the panel 212 of the room that can be arrived at is not changed, and the color of the panel 212 of the room that cannot be arrived at may be displayed semi-transparently, or the brightness may be reduced. Moreover, the luminosity of the panel 212 of the room that cannot be arrived at may be changed every predetermined time period. However, the color of the panel 212 of the room that cannot be arrived at is not changed, and the brightness of the panel 212 of the room that can be arrived at may be increased, or the panel 212 of the room that can be arrived at may be surrounded by a frame of a predetermined color (gold).

Figure 14:
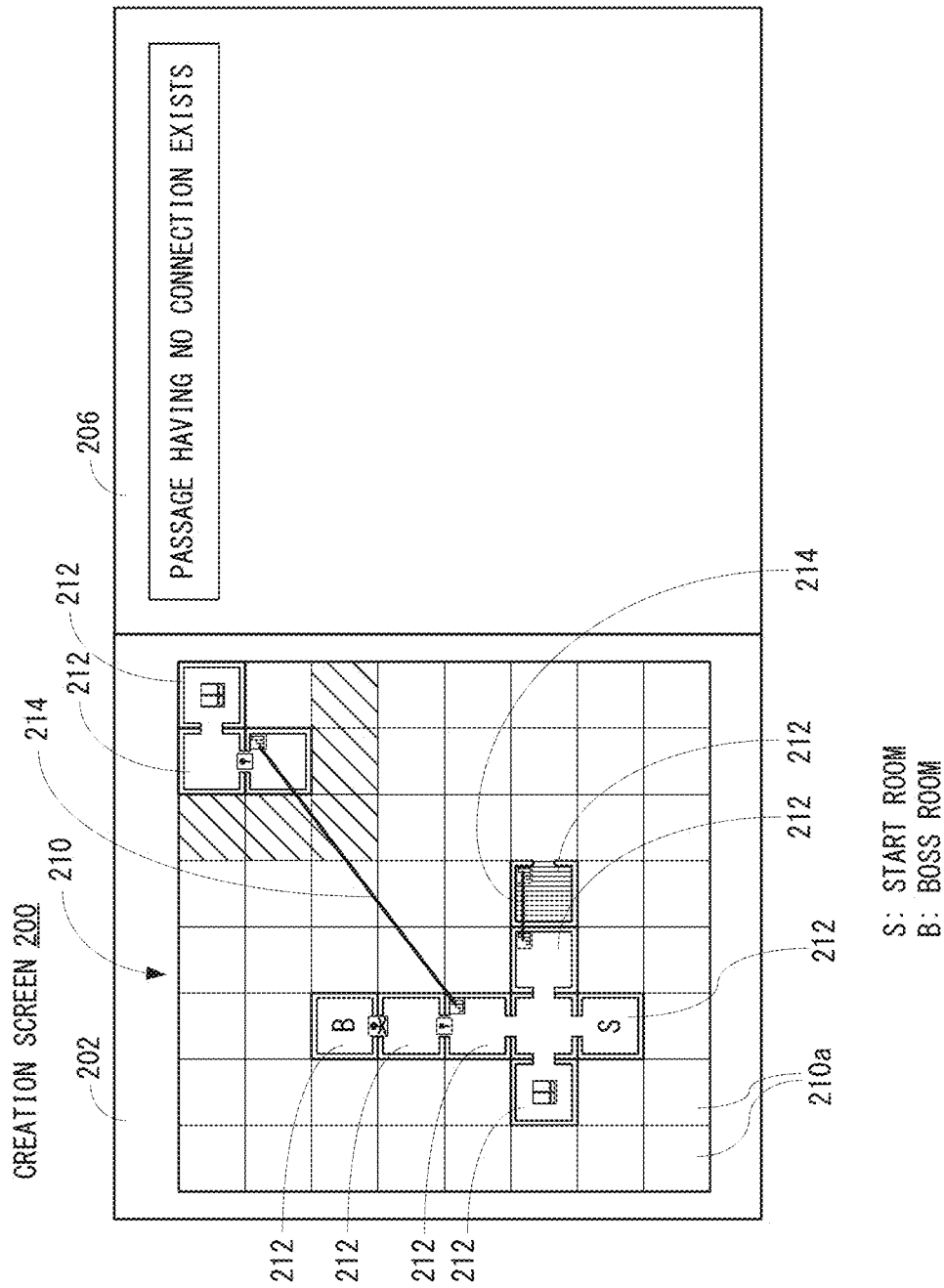
FIG. 14 is a view showing a non-limiting fifth example creation screen of a game stage.

Moreover, it is possible to confirm whether the preconditions are satisfied by depressing a predetermined button (Y button 56) in this embodiment. In this case, the creation screen 200 as shown in FIG. 14 is displayed on the display 12. In this creation screen 200, the background color is made blue for the panels 212 of the virtual rooms that the passage or stairs are connected in a game stage during creation. Moreover, the stairs that are connected to each other are coupled by a line 214. Moreover, in this embodiment, when confirming whether the preconditions are satisfied, as shown in FIG. 14, a display area 206 is provided instead the selection area 204, and a message for explaining the precondition that is not being satisfied is displayed in this display area 206 with a text form. Moreover, at this time, the background color of the panel 212 related to the precondition that is not being satisfied is made yellow. However, in FIG. 14, it is indicated by a vertically striped pattern that the background color of the panel 212 is yellow. In the example shown in FIG. 14, a message indicating that there is a passage being not connected is displayed in the display area 206, and the background color of the panel 212 corresponding to the virtual room that does not satisfy the preconditions, that is, the panel 212 arranged at (5, 3) is shown by yellow.

Although illustration is omitted, in also a case where the stairs are not connected to each other, the background color of the panel 212 corresponding to the virtual room that the stairs not connected is arranged is shown by yellow.

Moreover, when the number of the treasure chests is smaller than the number of the locked doors, a message indicating that there are not enough treasure chests is displayed.

Furthermore, when the start room S or/and the boss room B are not arranged, a message indicating that the start room S or/and the boss room B should be arranged is displayed.

If a game stage is created correctly, it becomes possible to play a game in this created game stage. For example, when the player designates the panel 212 of the start room S by the designation image 230 and depresses the A button 53, it is instructed to start play of the game in the game stage.

Then, a three-dimensional game stage is created based on the two-dimensional game stage that is created using a plurality of panels 212. At this time, the set information on the component 220 corresponding to each of the plurality of panels 212 constituting the two-dimensional game stage is referred to. At the beginning the game start, a game screen 300 for the start room S is displayed on the display 12.

Figure 15:
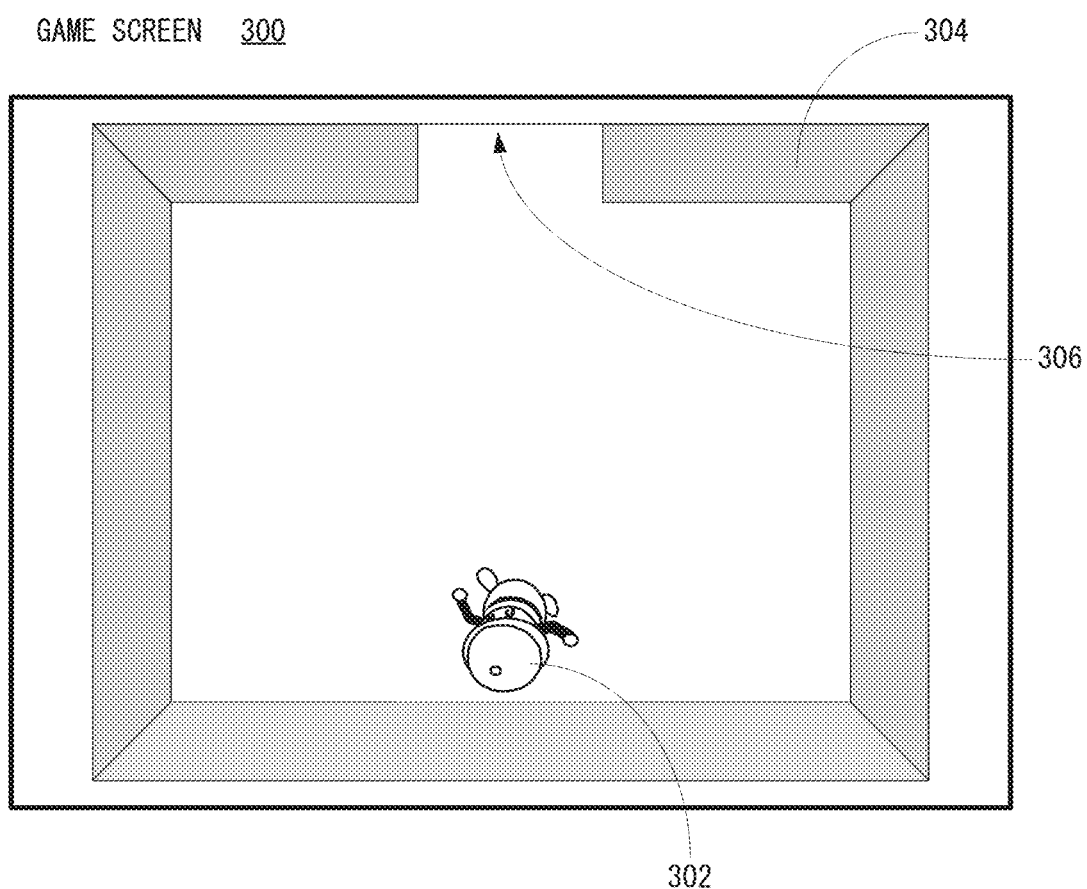
FIG. 15 is a view showing a non-limiting first example game screen.

FIG. 15 shows a non-limiting example game screen 300 about the start room S. The player object 302 is located in a start position of the start room S. In the following, when referring to a direction for the game screen 300, the term "up", "down", "left" or "right" when viewing the game screen 300 from the front is used. Moreover, in this embodiment, an image viewing the virtual room from the above is displayed in the game screen 300. Furthermore, in the game screen 300 of this embodiment, background objects, enemy objects and items that are not particularly necessary are omitted.

In addition, the game screen 300 that the virtual room is viewed from the above the three-dimensional virtual space is displayed on the display 12 and the player object 302 is displayed in the game screen 300, but it does not need to be limited to this. When playing with a first person viewpoint (first-person shooter), the player object 302 does not need to be displayed. In such a case, the game screen 300 based on the first person viewpoint is displayed on the display 12.

The start room S is partitioned by the wall 304 as a background object, and the passage 306 is formed in the up side wall 304. A point that the room is partitioned by the wall 304 is the same for other virtual rooms.

According to an operation of the player, the player object 302 is moved in the virtual space, attacks the enemy object existing in the virtual space, and obtains (or acquires) the item arranged in the virtual space. In the start room S of FIG. 15, according to an operation of the player, the player object 302 is moved to the virtual room of the up side through the passage 306.

Figure 16:
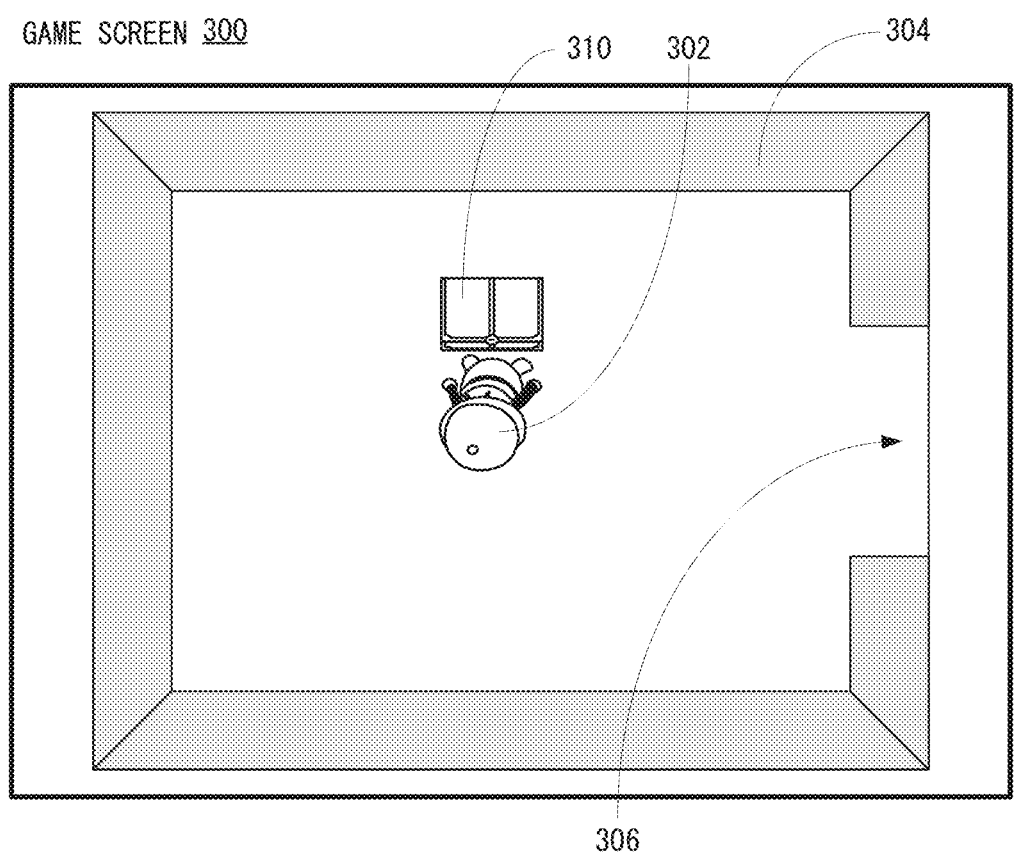
FIG. 16 is a view showing a non-limiting second example game screen.

FIG. 16 shows a non-limiting example game screen 300 about the normal room different from the start room S and the boss room B. In the game screen 300 shown in FIG. 16, the passage 306 is formed in the right side wall 304, and the player object 302 arrives at the normal room shown in FIG. 16 through this passage 306 from another virtual room.

As shown in FIG. 16, the treasure chest 310 is arranged in the normal room, and the player object 302 stands in front of the treasure chest 310. The treasure chest 310 may be arranged in the normal room in advance, may be arranged according to having defeated all the enemy objects that exist in the normal room, or may be arranged in the normal room according to having used a predetermined item.

Figure 17:
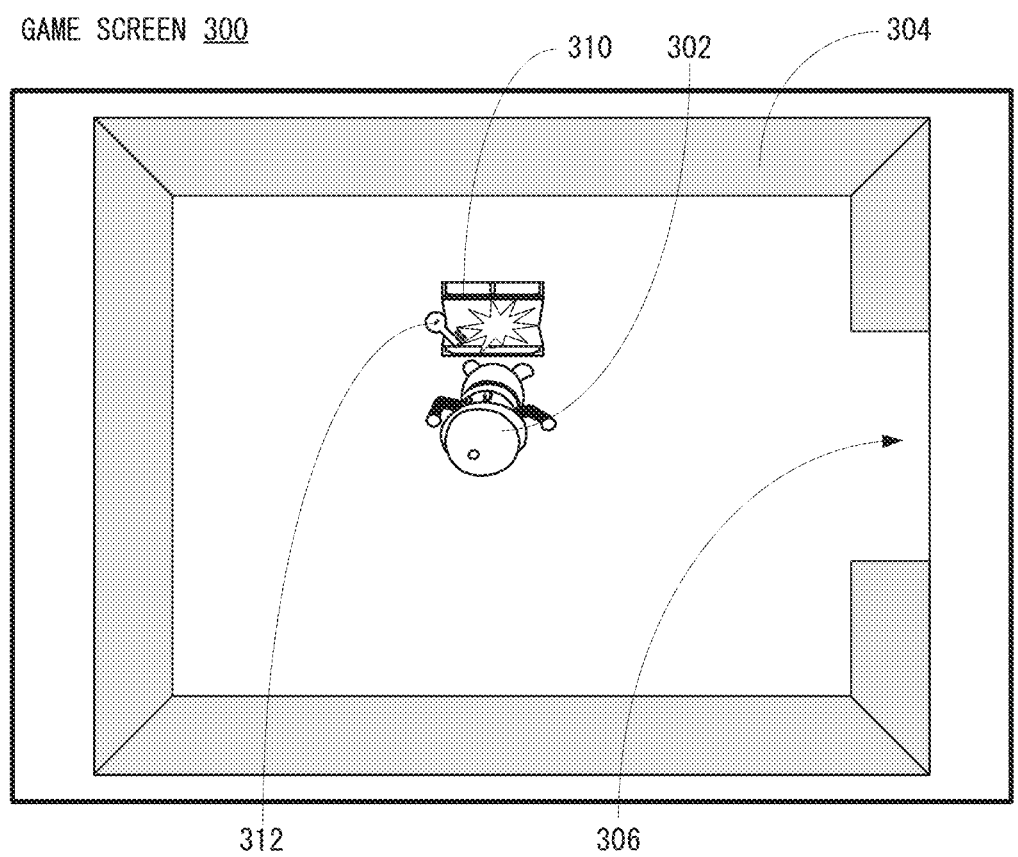
FIG. 17 is a view showing a non-limiting third example game screen.

In the game screen 300 shown in FIG. 16, if a condition that the key 312 appears from the treasure chest 310 when the player object 302 opens this treasure chest 310 according to an operation of the player is set, the key 312 appears from the treasure chest 310 as shown in FIG. 17 and is obtained by the player object 302. As described above, when the number of the treasure chests 310 not having been opened out of one or more treasure chests 310 arranged in the game stage is larger than the number of the locked doors not having been released, it is not the condition that the key 312 appears from the treasure chest 310.

Figure 18:
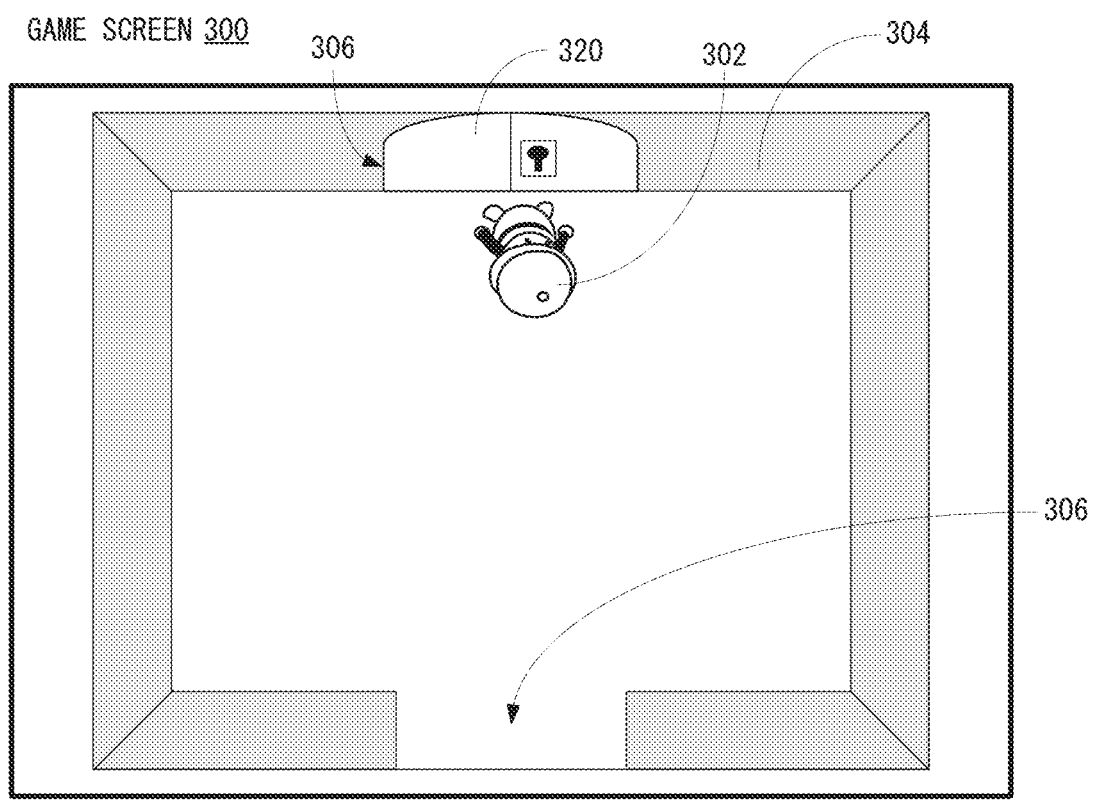
FIG. 18 is a view showing a non-limiting fourth example game screen.

FIG. 18 shows a non-limiting example game screen 300 about another normal room. In the game screen 300 shown in FIG. 18, the passages 306 are formed in the up side wall 304 and the down side wall 304, respectively. The locked door 320 is arranged in the passage 306 provided in the up side wall 304. On the other hand, not only the locked door but the door without lock are arranged in the passage 306 provided in the down side wall 304.

The player object 302 arrives at the normal room shown in FIG. 18 through the passage 306 provided in the down side wall from another virtual room. If the locked door 320 is opened, it is possible to move to the up side virtual room. It is necessary to release the locked door 320 with the key 312 in order to open the locked door 320. However, since the locked door 320 cannot be released when the key 312 is not possessed, the treasure chest 310 not having been opened yet is searched. Moreover, when the passage 306 provided with the locked door 320 is communicated to the boss room B, the locked door 320 (boss locked door) can be released only with a boss key. As described above, since the boss key can be obtained at the last in the number of the keys required to clear the game stage, it is necessary to search the treasure chest 310 not having been opened if the boss key is not possessed.

In the game screen 300 shown in FIG. 18, if the player object 302 opens the locked door 320 according to an operation of the player, the number of the keys 312 that the player object 302 possesses is decremented by 1 (one).

Figure 19:
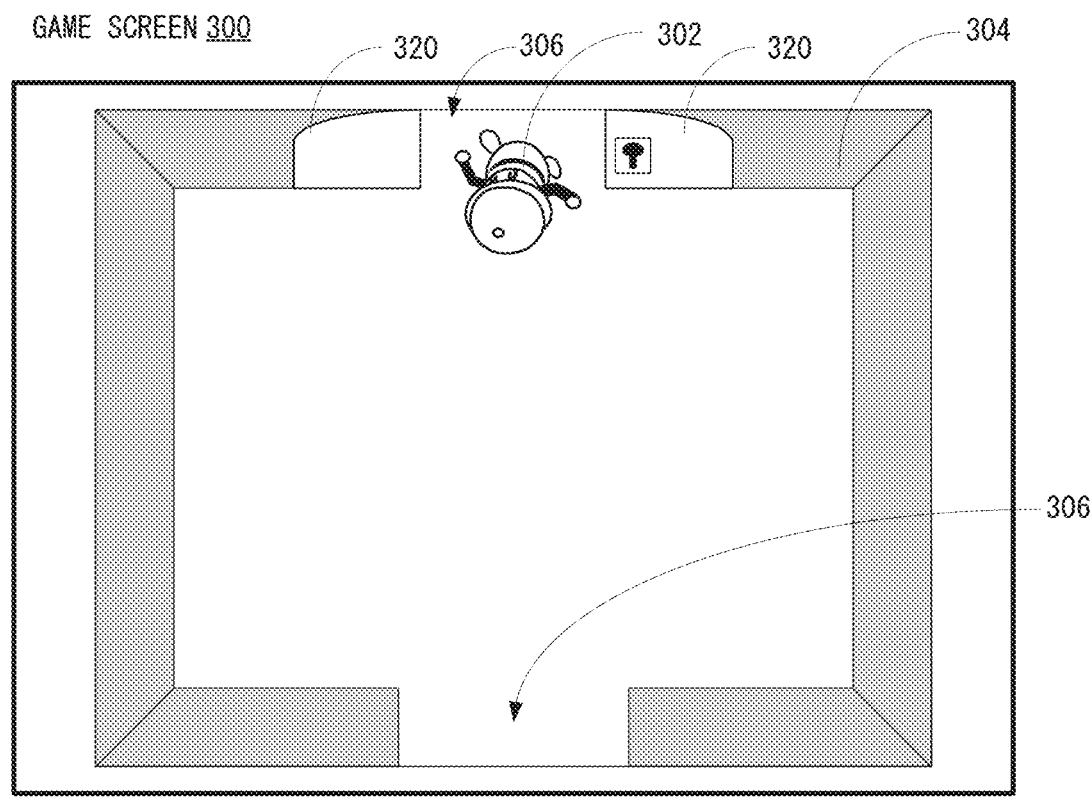
FIG. 19 is a view showing a non-limiting fifth example game screen.

If the locked door 320 is open, as shown in FIG. 19, the player object 302 can be moved according to an operation of the player through the passage that the locked door 320 is arranged, and can arrive at (move to) another virtual room that the passage is connected.

Although illustration is omitted, if the player object 302 descends (or ascends) on the stairs provided in the virtual room according to an operation of the player, the player object 302 can move to another virtual room by ascending (or descending) on the stairs connected that stairs.

Moreover, although illustration is omitted, if arriving at the boss room B, the player object 302 can attack the boss enemy object according to an operation of the player. Moreover, the player object 302 is attacked by the boss enemy object, or defends the attack according to an operation of the player. The game stage is cleared if the player object 302 defeats the boss enemy object. Moreover, if the player object 302 is defeated by the boss enemy object, the game of the game stage is over.

Figure 20:
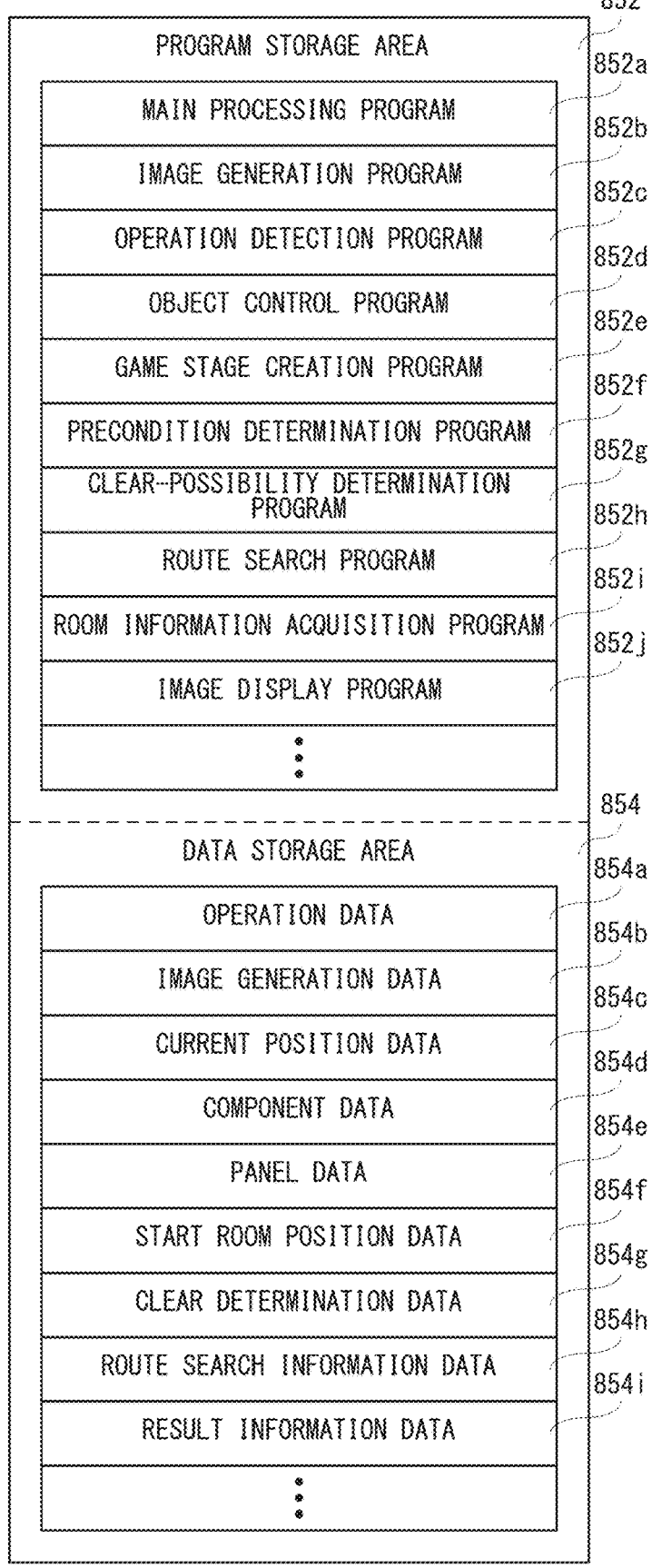
FIG. 20 is an illustration view showing a non-limiting example memory map of a DRAM of the main body apparatus shown in FIG. 6.

FIG. 20 is an illustration view showing a non-limiting example memory map 850 of the DRAM 85 shown in FIG. 6. As shown in FIG. 20, the DRAM 85 includes a program storage area 852 and a data storage area 854. The program storage area 852 is stored with a program of a game application (i.e., game program) that is an example of an information processing program. As shown in FIG. 20, the game program includes a main processing program 852*a*, an image generation program 852*b*, an operation detection program 852*c*, an object control program 852*d*, a game stage creation program 852*e*, a precondition determination program 852*f*, a clear-possibility determination program 852*g*, a route search program 852*h*, a room information acquisition program 852*i*, an image display program 852*j*, etc.

However, a function of displaying images such as a game image is a function that the main body apparatus 2 is provided with. Therefore, the image display program 852*j* is not included in the game program.

Although detailed description is omitted, at a proper timing after a power of the main body apparatus 2 is turned on, a part or all of each of the programs 852*a*-852*i* are read from the flash memory 84 or/and a storage medium attached to the slot 23 so as to be stored in the DRAM 85. However, a part or all of each of the programs 852*a*-852*i* may be acquired from other computers capable of performing communication with the main body apparatus 2. Moreover, at a proper timing after the power of the main body apparatus 2 is turned on, the image display program 852*j* is read from the flash memory 84 so as to be stored in the DRAM 85.

The main processing program 852*a* is a program for executing overall game processing of a virtual game of this embodiment. The image generation program 852*b* is a program for generating display image data corresponding to various kinds of images such as a game image using image generation data 854*b*.

The operation detection program 852*c* is a program for acquiring the operation data 854*a* from the left controller 3 or/and the right controller 4. That is, the operation data 854*a* according to an operation input by the player is acquired. The object control program 852*d* is a program for controlling an action or motion of the player object 302 based on an operation of the player, and controlling an action or motion of the non-player object regardless of an operation of the player.

The game stage creation program 852*e* is a program for creating a game stage according to an operation of the player. The precondition determination program 852*f* is a program for a determination whether the preconditions for executing clear-possibility determination processing are satisfied in the creation of the game stage. The clear-possibility determination program 852*g* is a program for determining whether the game stage that the preconditions are satisfied can be cleared.

The route search program 852*h* is a program for performing a route search form the start room S in the clear-possibility determination processing, thereby to investigate whether the game stage can be cleared by opening all the treasure chests (that is, the route search is successful) or whether the game stage cannot be cleared due to deficiency of key (that is, the route search is failure). The room information acquisition program 852*i* is a program for acquiring room information on the specified virtual room. As described above, the room information includes the arrival check information of the room and discovery information of the locked door.

The image display program 852*j* is a program for outputting to a display the display image data generated according to the image generation program 852*b*. Therefore, the images (i.e., the creation screen 200 and the game screen 300, etc.) corresponding to the display image data are displayed on the display such as the display 12.

In addition, the program storage area 852 is further stored with a sound output program for outputting a sound such as a BGM, a communication program for performing communication with other apparatuses, a backup program for storing data in a nonvolatile storage medium such as the flash memory 84, etc.

Moreover, the data storage area 854 is stored with operation data 854*a*, image generation data 854*b*, current position data 854*c*, component data 854*d*, panel data 854*e*, start room position data 854*f*, clear determination data 854*g*, route search information data 854*h*, result information data 854*i*, etc.

The operation data 854*a* is operation data received from the left controller 3 or/and the right controller 4. In this embodiment, when the main body apparatus 2 receives the operation data from both the left controller 3 and the right controller 4, the main body apparatus 2 stores the operation data 854*a* classified into the left controller 3 and the right controller 4, respectively.

The image generation data 854*b* is data required for generating the display image data, such as polygon data and texture data.

The current position data 854*c* is data of position coordinates of the characters or objects capable of moving in the virtual space in the current frame, such as the player object 302, enemy object, etc.

The component data 854*d* is data for a plurality of components 220 prepared in advance, or data for a plurality of components 220 that the player or the player object 302 acquires, and includes not only the image data of the components 220 but data of the set information for corresponding virtual room.

The panel data 854*e* is data for one or more panels 212 constituting a game stage having been created by the player or during creation by the player, and includes identity information of the components 220 corresponding to respective panels 212, image data of the respective panels 212 and positional information of the respective panels 212. Moreover, when stairs is arranged in the virtual room corresponding to the panel 212, the positional information (two-dimensional position coordinate) of the stairs in a case where this panel 212 will be arranged in the arrangement area 210 is also included.

The start room position data 854*f* is data of the positional information on the start room S. The clear determination data 854*g* is data of a determination result when determining whether the created game stage can be cleared. In this embodiment, a determination result indicating the clear is impossible, sometimes the clear is not possible, or the clear is always possible is shown.

The route search information data 854*h* is data of respective variables included in the above-described route search information. The result information data 854*i* is data of respective variables included in the above-described result information.

Although illustration is omitted, for executing the game program, the data storage area 854 is stored with other data, and provided with flags and timers (counters).

Figure 21:
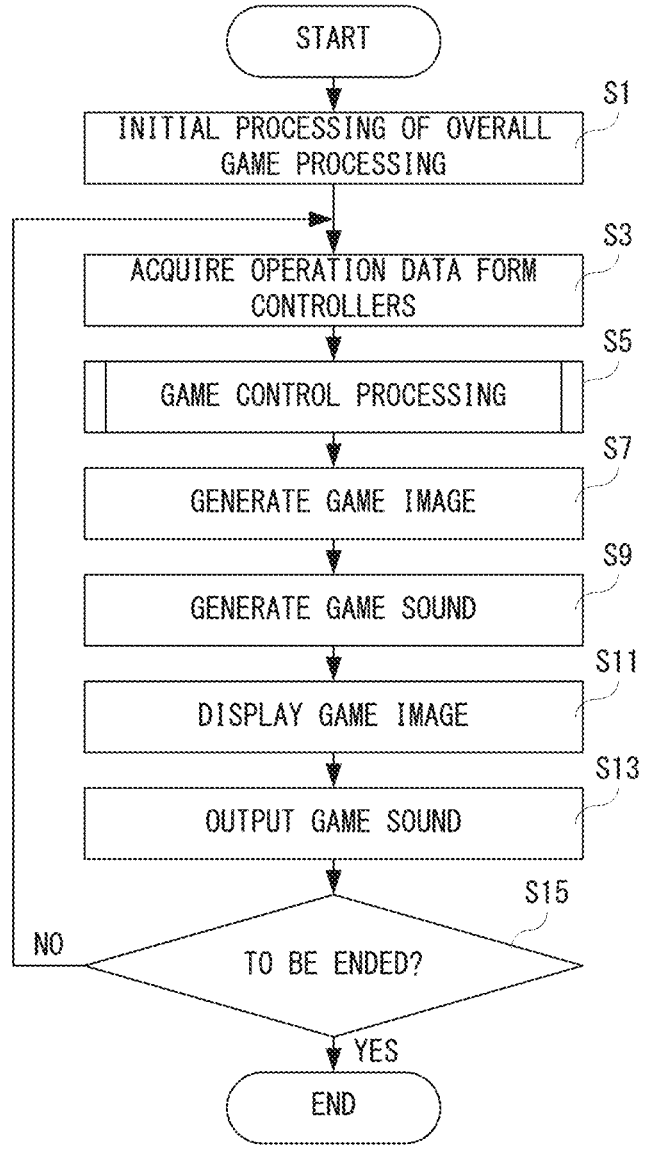
FIG. 21 is a flowchart showing non-limiting example overall game processing by a processor(s) of the main body apparatus shown in FIG. 6.

FIG. 21 is a flowchart showing non-limiting example processing of the game program (overall game processing) by the processor 81 (or computer) of the main body apparatus 2. In the following, using FIG. 21-FIG. 27, the overall game processing, game control processing, clear-possibility determination processing, route search processing and room information acquisition processing will be respectively described, but duplicate description will be omitted for steps executing the same or similar processing.

However, processing of respective steps of the flowcharts shown in FIG. 21-FIG. 27 are mere examples, and if the same or similar result is obtainable, an order of the respective steps may be exchanged. Moreover, in this embodiment, it will be described that the processor 81 basically executes the processing of respective steps of the flowcharts shown in FIG. 21-FIG. 27; however, some steps may be executed by a processor(s) or/and a dedicated circuit(s) other than the processor 81.

When a power of the main body apparatus 2 is turned on, prior to execution of the overall game processing, the processor 81 executes a boot program stored in a boot ROM not shown, whereby respective units including the DRAM 85, etc. are initialized. The main body apparatus 2 starts the overall game processing when the execution of the game program of this embodiment is instructed by the user.

As shown in FIG. 21, when the overall game processing is started, the processor 81 executes initial processing in a step S1. In the initial processing, for example, the processor 81 constructs a virtual space for generating and displaying the game image of a game main part, and locates respective characters or objects appearing in the virtual space at their initial positions. Moreover, the processor 81 sets initial values of various parameters to be used by processing of the game main part included in game control processing (S5).

In addition, although detailed description is omitted, prior to the start of the overall game processing, it is determined whether the left controller 3 and the right controller 4 are attached to the main body apparatus 2, and when the left controller 3 and the right controller 4 are detached from the main body apparatus 2, pairing processing between the main body apparatus 2, and the left controller 3 and the right controller 4 is executed.

Subsequently, the processor 81 acquires the operation data transmitted from the controller(s) (3, 4) in a step S3, and executes the game control processing (see FIG. 22-FIG. 23) described later in a step S5.

In a next step S7, the processor 81 generates the game image for displaying on the display 12. Briefly described, the processor 81 reads the data indicating a result of the game control processing in the step S5 and the image generation data 854*b* from the DRAM 85, thereby to generate game image data. Therefore, during creation of the game stage, the game image data corresponding to the creation screen 200 as shown in FIG. 8-FIG. 14 is generated, and during play of the game of the game stage, the game image data corresponding to the game screen 300 as shown in FIG. 15-FIG. 19 is generated.

Furthermore, in a step S9, the processor 81 generates a game sound for outputting to the speaker 88. Briefly described, the processor 81 reads the data indicating a result of the game control processing in the step S5 and the sound data from the DRAM 85, thereby to generate game sound data.

In a step S11, the game image data generated in the step S7 is output to the display 12, and in a step S13, the game sound data generated in the step S9 is output to the speaker 88 through the codec circuit 87. However, the game sound data may be output to the sound input/output (I/O) terminal 25.

Then, it is determined, in a step S15, whether the game is to be ended. Determination in the step S15 is executed according to whether the player instructs to end the game, for example. If "NO" is determined in the step S15, that is, if the game is not to be ended, the process returns to the step S3. On the other hand, if "YES" is determined in the step S15, that is, if the game is to be ended, the overall game processing is terminated.

Figure 22:
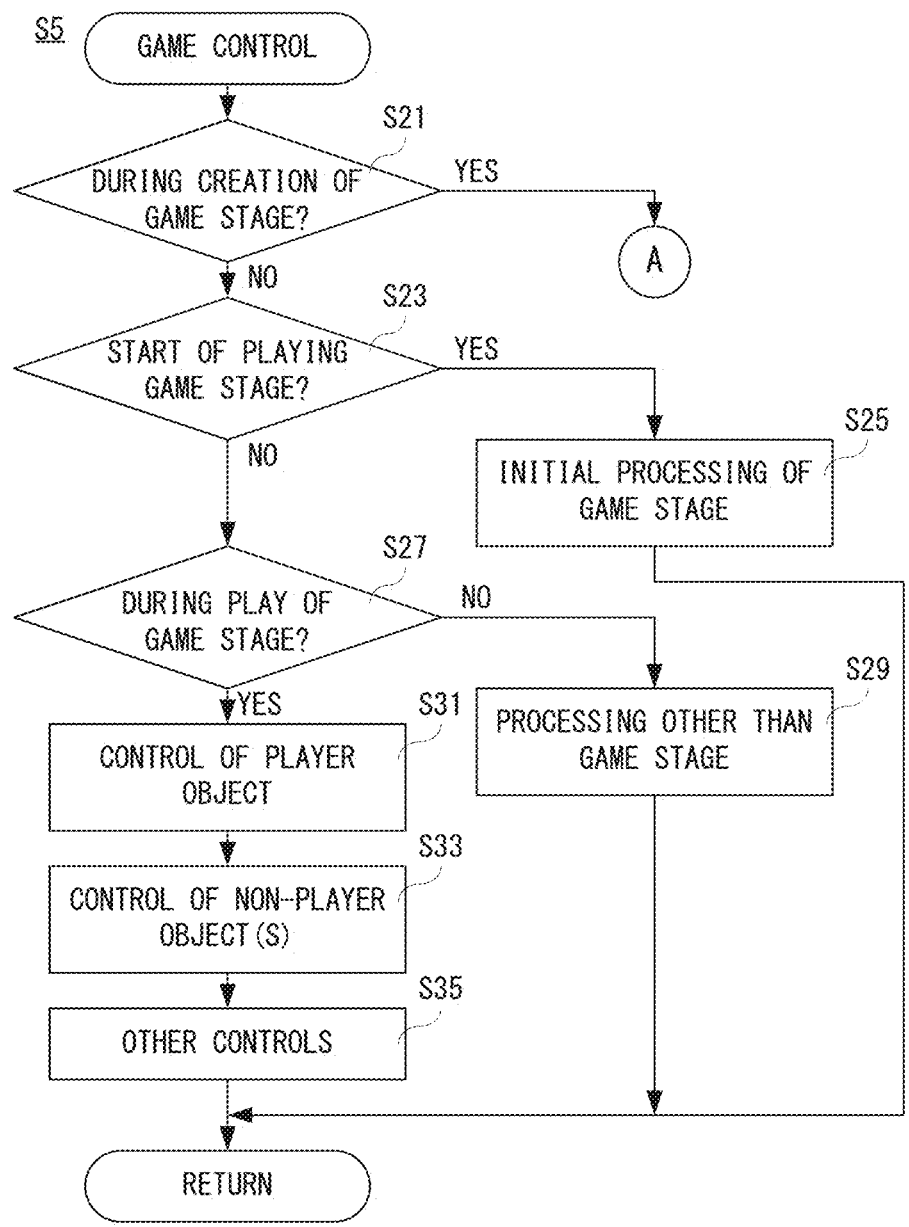
FIG. 22 is a flowchart showing a part of non-limiting example game control processing by the processor(s) of the main body apparatus shown in FIG. 6.
Figure 23:
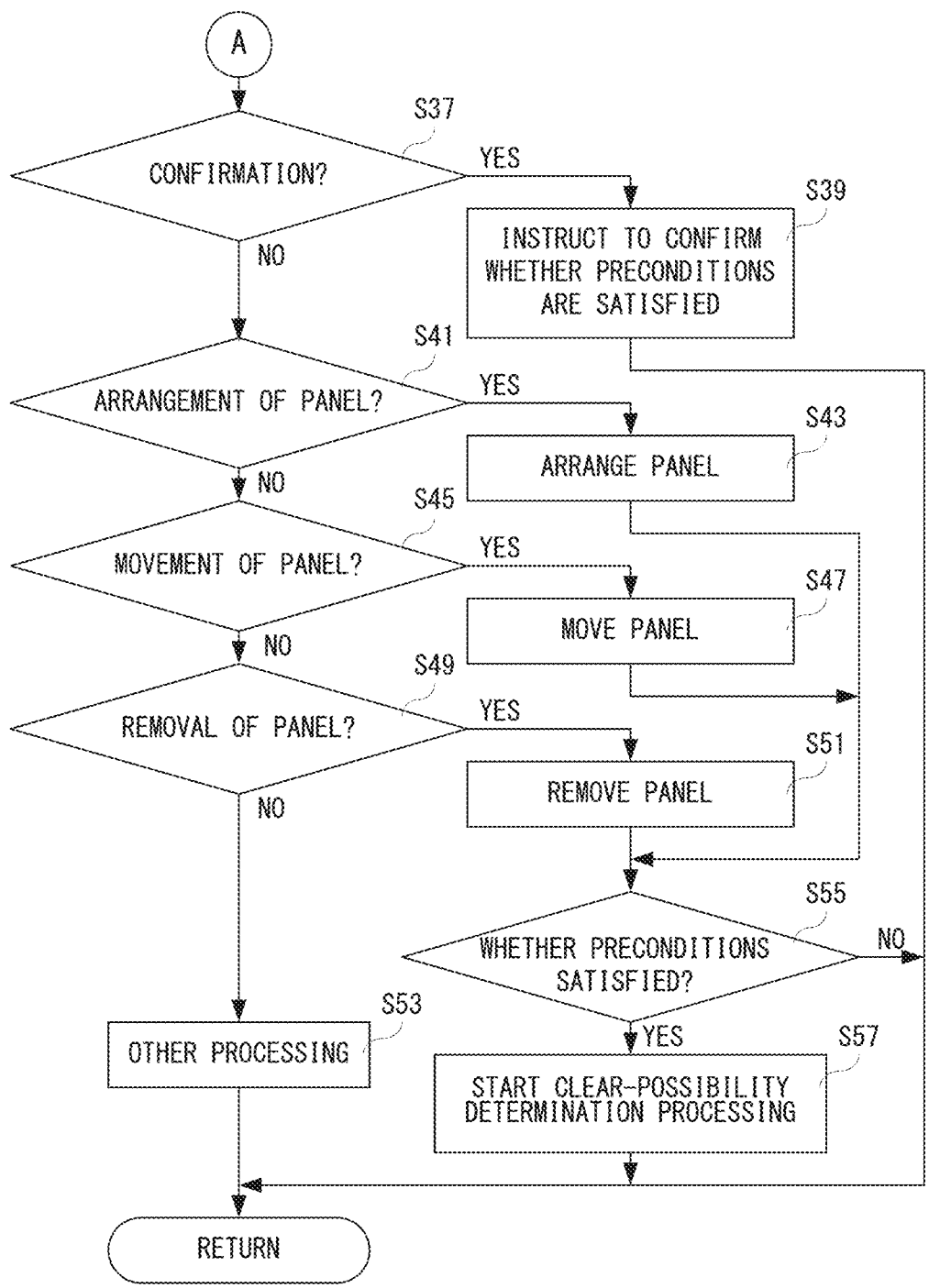
FIG. 23 is a flowchart showing another part of the non-limiting example game control processing by the processor(s) of the main body apparatus shown in FIG. 6, following FIG. 22.

FIG. 22-FIG. 23 are flowcharts showing non-limiting example game control processing shown in step S5 of FIG. 21 of the processor 81 (or computer) of the main body apparatus 2.

As shown in FIG. 22, if the game control processing is started, the processor 81 determines, in a step S21, whether it is during creation of a game stage. If "YES" is determined in the step S21, that is, if it is during creation of the game stage, the process proceeds to a step S37 shown in FIG. 23. On the other hand, if "NO" is determined in the step S21, that is, if it is not during creation of the game stage, it is determined, in a step S23, whether it is a start of playing the game stage. The processor 81 determines, in the step S23, whether a play start of the game stage is instructed.

If "YES" is determined in the step S23, that is, if the play start of the game stage is instructed, in a step S25, initial processing of the game stage is executed and the game control processing is ended, and the process returns to the overall game processing. In the step 25, for example, a virtual space for generating and displaying the game image for the game stage is constructed, and respective characters or objects appearing in the virtual space are arranged at their initial positions.

On the other hand, if "NO" is determined in the step S23, that is, if the play start of the game stage is not instructed, it is determined, in a step S27, whether it is during play of the game stage. If "NO" is determined in the step S27, that is, if it is not during play of the game stage, processing other than the game stage is executed in a step S29, and the process returns to the overall game processing. In the step S29, the game stage to be played is selected, and processing for playing of the main part of a game different from the game stage is executed.

On the other hand, if "YES" is determined in the step S27, that is, if it is during play of the game stage, in a step S31, control of the player object 302 is performed according to the operation data acquired in the step S3. That is, the processor 81 makes the player object 302 perform an action according to the operation data. Therefore, the player object 302 moves inside the virtual room constituting the game stage, acquires the key 312 by opening the treasure chest 310, attacks the enemy object including the boss object, or defends an attack of the enemy object.

In a next step S33, control of the non-player objects is performed regardless of the operation data acquired in the step S3. That is, the processor 81 makes the non-player objects action according to a program, regardless of the operation data. Therefore, the enemy objects move inside the game stage, attacks the player object 302, or receives an attack of the player object.

In a subsequent step S35, other control is performed and the game control processing is ended, and the process returns to the overall game processing. In the step S35, the processor 81 makes the items including the key 312 appear (be arranged) or disappear, or opens the doors such as a locked door 320. Moreover, when the player object 302 obtains the key 312, the processor 81 increments the number of the keys 312 possessed by the player object 302 is by 1 (one). Furthermore, when the player object 302 releases the locked door 320 using the key 312 possessed by the player object 302, the processor 81 decrements the number of the keys 312 by 1 (one).

If it is during creation of the game stage as described above, as shown in FIG. 23, it is determined, in the step S37, whether it is a confirmation as to whether the preconditions for the game stage during creation are satisfied. That is, the processor 81 determines whether the operation data detected in the step S3 indicates depression of the Y button 56.

If "YES" is determined in the step S37, that is, if it is a confirmation as to whether the preconditions for the game stage during creation are satisfied, a confirmation as to whether the preconditions are satisfied is instructed in a step S39, and the game control processing is ended, and the process returns to the overall game processing. In the step S39, a determination result on whether the preconditions are satisfied (that is, the last determination result) is referred to, and based on this, display of the creation screen 200 as shown in FIG. 14 is instructed.

On the other hand, if "NO" is determined in the step S37, that is, if it is not a confirmation as to whether the preconditions for the game stage during creation are satisfied, it is determined, in a step S41, whether it is arrangement of the panel 212. Here, the processor 81 determines whether the panel 212 corresponding to the component 220 selected in the selected area 204 is to be arranged in the arrangement area 210.

If "YES" is determined in the step S41, that is, if it is arrangement of the panel 212, the panel 212 corresponding to the component 220 selected in the selected area 204 is arranged on the specified grid 210*a* in a step S43, and the process proceeds to a step S55.

On the other hand, if "NO" is determined in the step S41, that is, if it is not arrangement of the panel 212, it is determined, in a step S45, whether it is movement of the panel 212. The processor 81 determines whether it is instructed to move to another grid 210*a* by specifying the panel 212 arranged in the arrangement area 210. If "YES" is determined in the step S45, that is, if it is movement of the panel 212, the specified panel 212 is moved to the grid 210a designated by the designation image 230 in a step S47, and the process proceeds to the step S55. At this time, the designation image 230 is moved according to the operation data acquired in the step S3.

On the other hand, if "NO" is determined in the step S45, that is, if it is not movement of the panel 212, it is determined, in a step S49, whether the panel 212 is to be removed. The processor 81 determines whether the X button 55 is depressed in a state where the panel 212 is specified. If "YES" is determined in the step S49, that is, if the panel 212 is to be removed, the specified panel 212 is removed in a step S51, and the process proceeds to the step S55. That is, in the step S51, the processor 81 removes the specified panel 212 from the arrangement area 210, and displays the component 220 corresponding to the panel 212 concerned in the selection area 204 to be selectable.

On the other hand, if "NO" is determined in the step S49, that is, if the panel 212 is not to be removed, other processing is executed in a step S53, and the game control processing is ended, and the process returns to the overall game processing. In the step S53, the designation image 230 is moved according to the operation data acquired in the step S3 so as to select the component 220 in the selection area 204, or select the grid 210a or the panel 212 in the arrangement area 210.

In the step S55, it is determined whether the preconditions are satisfied. If "NO" is determined in the step S55, that is, if the preconditions are not satisfied, the game control processing is ended, and the process returns to the overall game processing. On the other hand, if "YES" is determined in the step S55, that is, if the preconditions are satisfied, in a step S57, the clear-possibility determination processing (see FIG. 24) described later is started, and the game control processing is ended, and the process returns to the overall game processing.

Figure 24:
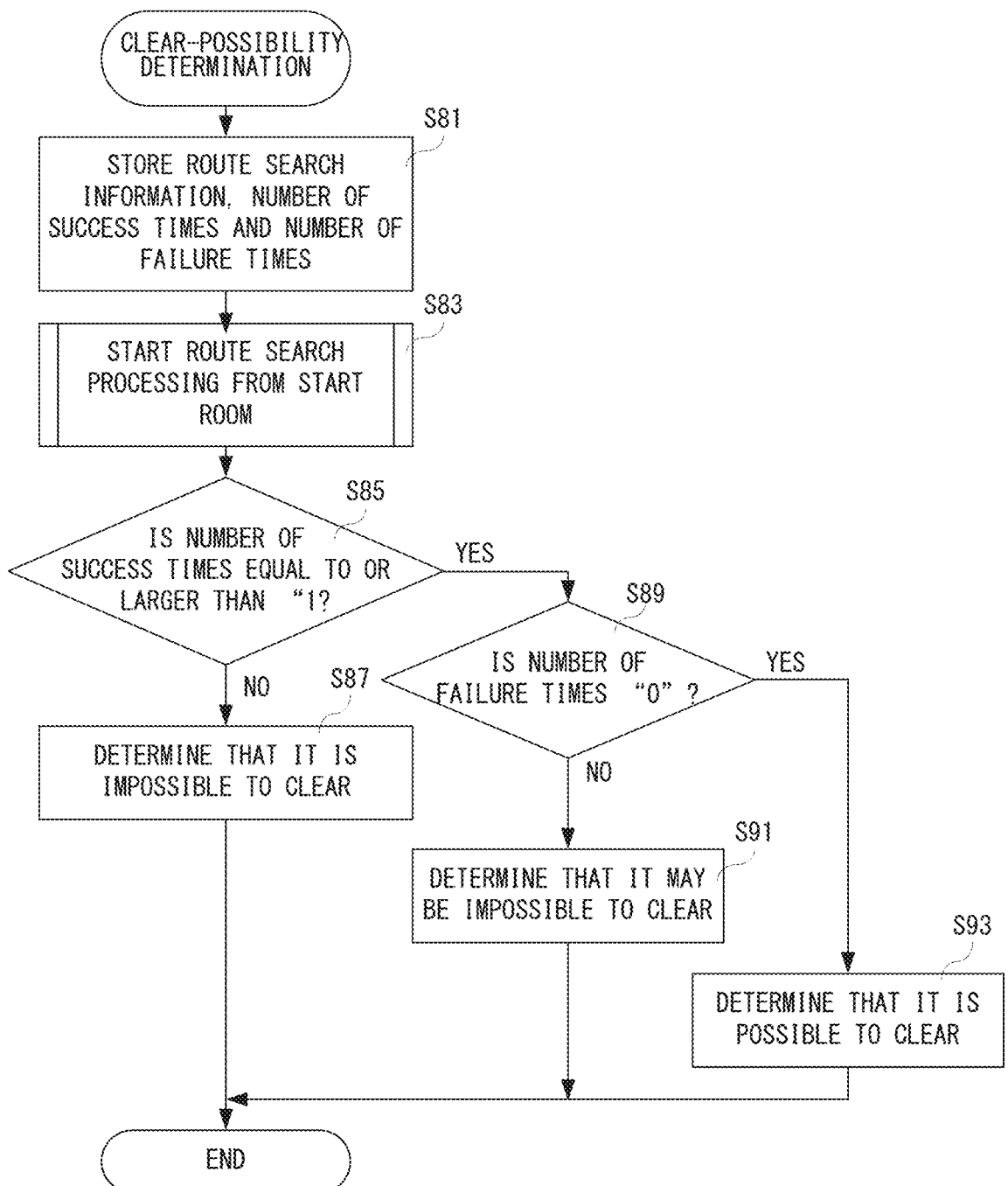
FIG. 24 is a flowchart showing non-limiting example clear-possibility determination processing by the processor(s) of the main body apparatus shown in FIG. 6.

FIG. 24 is a flowchart showing non-limiting example clearing-possibility determination processing. As shown in FIG. 24, when the clear-possibility determination processing is started, the processor 81 stores into the DRAM 85 the variables on the route search information and the result information in a step S81.

As described above, the route search information includes the arrival check information of the room, the discovery information of the locked door, the released/locked information, the number of the opened treasure chests, and the number of the keys being possessed. Moreover, the result information is information on a result of having performed the route search in the created game stage, and is the number of times that the route search is successful (that is, the number of success times) and the number of times that the route search is failure (that is, the number of failure times). When all the treasure chests 310 in the game stage can be opened, the route search is successful, and if the key 312 is used up before opening all the treasure chests 310 in the game stage (that is, when the key 312 is insufficient), the route search is failure.

In a next step S83, the route search processing (see FIG. 25) described later is started from the start room S, and it is determined, in a step S85, whether the number of success times is equal to or larger than 1 (one). If "NO" is determined in the step S85, that is, if the number of success times is 0 (zero), it is determined, in a step S87, that it is impossible to clear the game stage, and the clear-possibility determination processing is ended.

On the other hand, if "YES" is determined in the step S85, that is, if the number of success times is equal to or larger than 1 (one), it is determined, in a step S89, whether the number of failure time is 0 (zero). If "NO" is determined in the step S89, that is, if the number of failure times is equal to or larger than 1 (one), it is determined, in a step S91, that it is impossible to clear in some cases, and the clear-possibility determination processing is ended.

On the other hand, if "YES" is determined in the step S89, that is, if the number of failure times is 0 (zero), it is determined, in a step S93, that it is possible to clear, and the clear-possibility determination processing is ended.

A determination result of the step S87, S91 or S93 is stored as the clear determination data 854g in the data storage area 854 of the DRAM 85.

Figure 25:
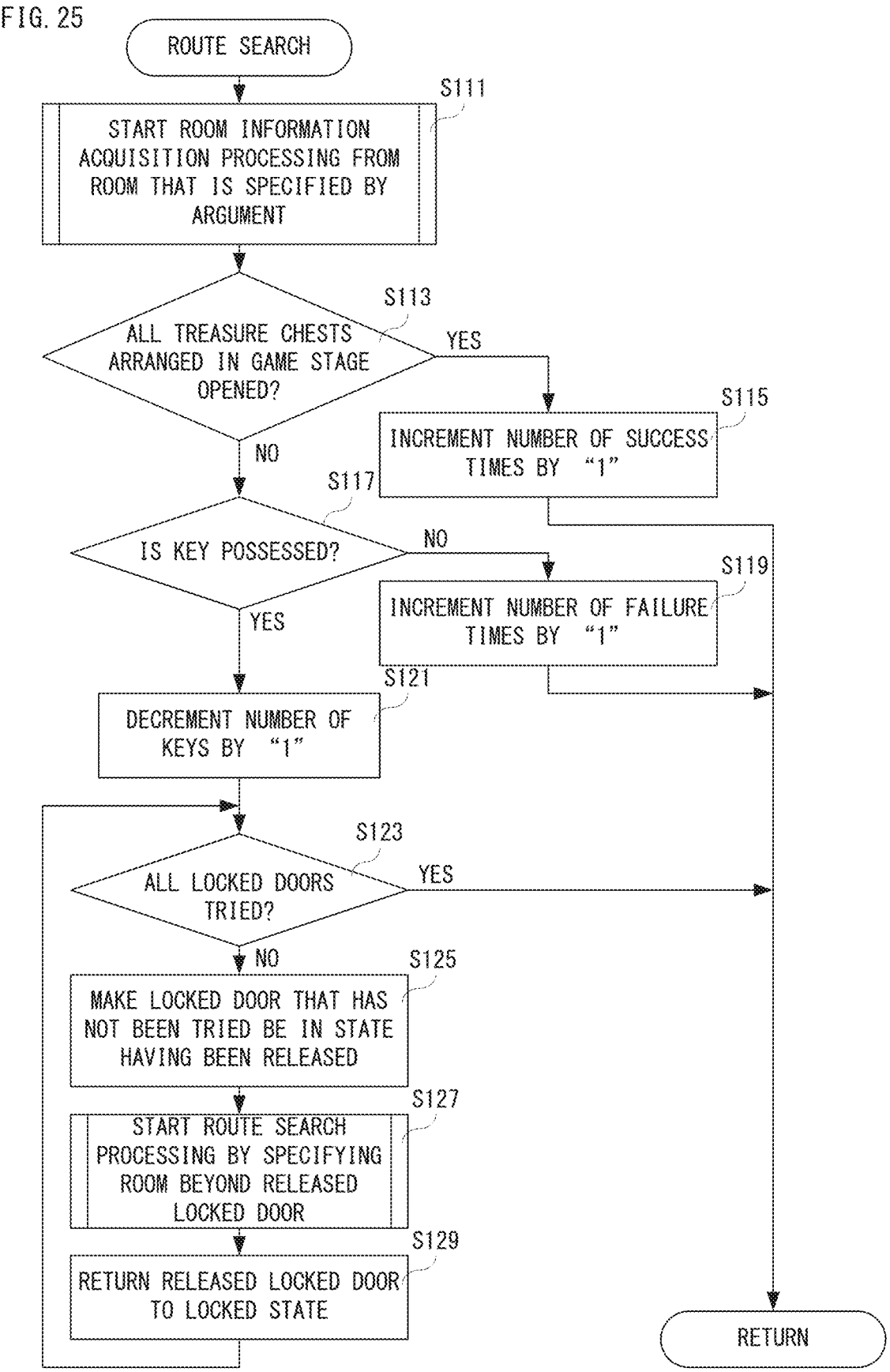
FIG. 25 is a flowchart showing non-limiting example route search processing by the processor(s) of the main body apparatus shown in FIG. 6.

FIG. 25 is a flowchart showing non-limiting example route search processing shown in the step S83 in FIG. 24. As shown in FIG. 25, in a step S111, the room information acquisition processing (see FIG. 26 and FIG. 27) described later is started from the virtual room specified by the argument. A room to be specified first by the argument when the room information acquisition processing is the start room S. As described later, when the locked door 320 is opened, in a step S111, the virtual room beyond the locked door 320 is specified. However, in the route search processing, the argument is the route search information, the result information and the position of the start room S. Moreover, the specified virtual room means the virtual room corresponding to the panel 212 specified in the arrangement area 210. The panel 212 is specified using the positional information.

In a subsequent step S113, it is determined whether all the treasure chests 310 arranged in the game stage are opened. If "YES" is determined in the step S113, that is, if all the treasure chests 310 arranged in the game stage are opened, the number of success times is incremented by 1 (one), and the route search processing is ended. On the other hand, if "NO" is determined in the step S113, that is, if there is a treasure chest 310 not having been opened out of the treasure chests 310 arranged in the game stage, it is determined, in a step S117, whether the key 312 is possessed.

If "NO" is determined in the step S117, that is, if the key 312 is not possessed, it is determined that the key 312 is insufficient, and the number of failure times is incremented by 1 (one) in a step S119, and the route search processing is ended to return to the clear-possibility determination processing. On the other hand, if "YES" is determined in the step S117, that is, if the key 312 is possessed, the number of the keys 312 is decremented by 1 (one) in a step S121, and it is determined, in a step S123, whether all the locked doors 320 are tried.

If "YES" is determined in the step S123, that is, if all the locked doors 320 are tried, the route search processing is ended, and the process returns to the clear-possibility determination processing. On the other hand, if "NO" is determined in the step S123, that is, if there is a locked door 320 not having been tried, the locked door 320 not having been tried should be made to be in a state having been released in a step S125.

In a subsequent step S127, the route search processing is started while specifying a room beyond the locked door 320 that should be made to be in the state having been released. At this time, the processor 81 suspends the route search processing that is being executed. After ending the route search processing in the step S127, the locked door 320 that should be made to be in the state having been released is returned to a state not having been released in a step S129, and the process returns to the step S123. That is, by ending the route search processing of the step S127, and executing the processing of the step S129, and the route search processing having been temporarily stopped is continued (or resumed).

Figure 26:
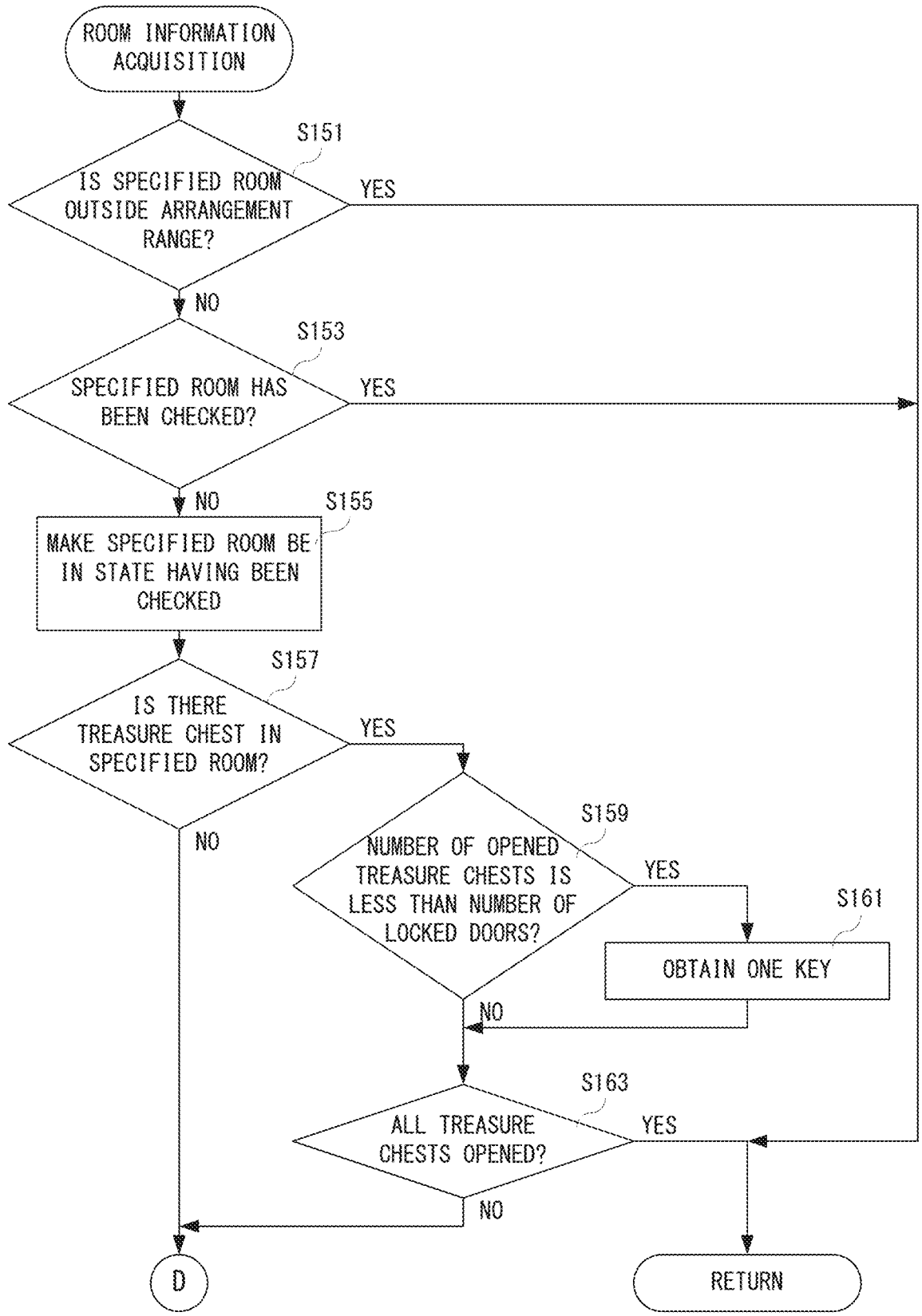
FIG. 26 is a flowchart showing a part of non-limiting example room information acquisition processing by the processor(s) of the main body apparatus shown in FIG. 6.
Figure 27:
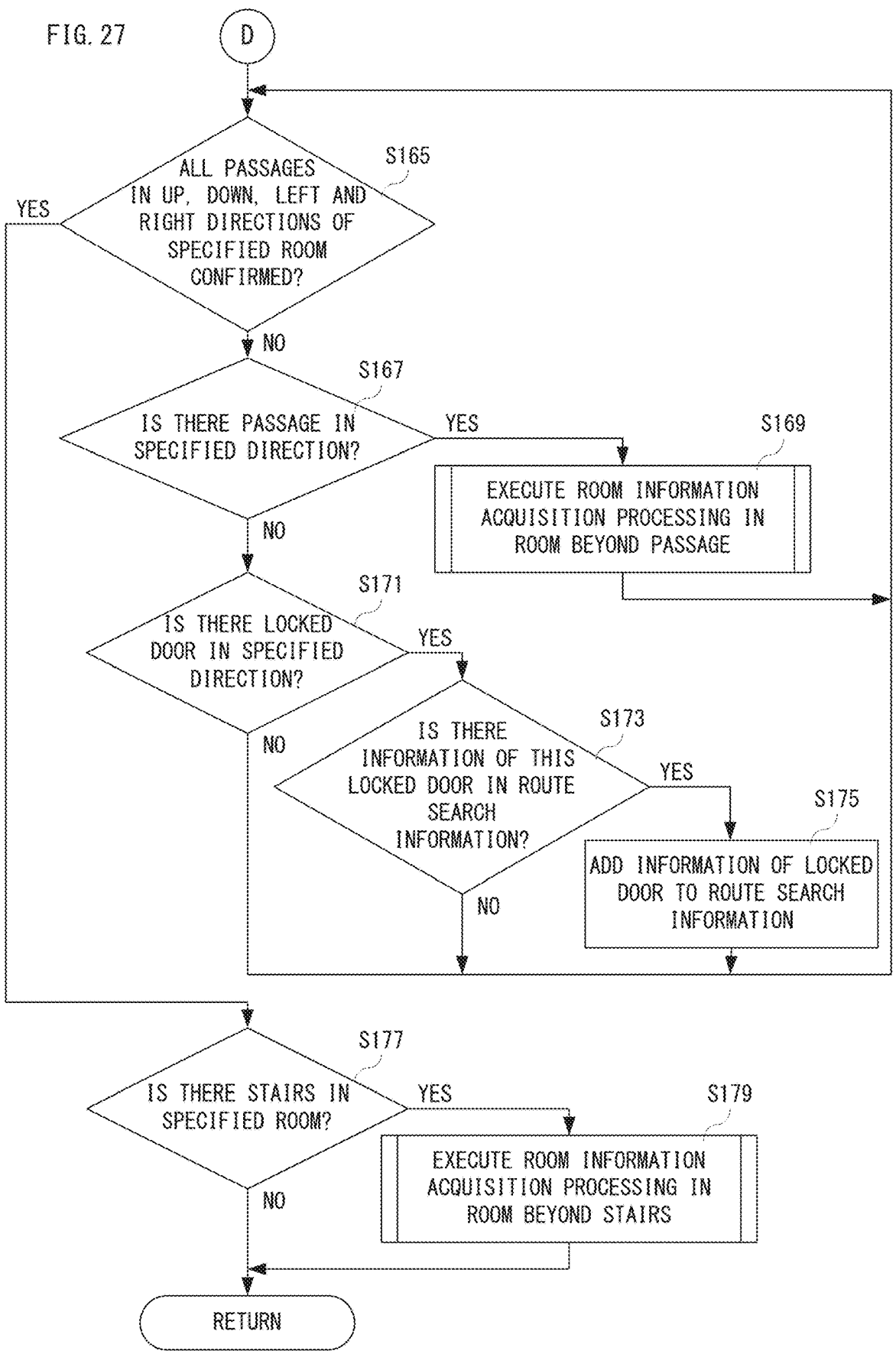
FIG. 27 is a flowchart showing another part of the non-limiting example room information acquisition processing by the processor(s) of the main body apparatus shown in FIG. 6, following FIG. 26.

FIG. 26 and FIG. 27 are flowcharts of a non-limiting example room information acquisition processing shown in the step S111 of FIG. 25. As shown in FIG. 26, when starting the room information acquisition processing, the processor 81 determines, in a step S151, whether the specified room is outside a range of the arrangement range. Here, it is determined whether the specified grid 210a is a grid 210a that the panel 212 cannot be arranged.

If "YES" is determined in the step S151, that is, if the specified room is outside the range of the arrangement range, the room information acquisition processing is ended, and the process returns to the route search processing shown in FIG. 25. On the other hand, if "NO" is determined in the step S151, that is, if the specified room is within the range of the arrangement range, it is determined, in a step S153, whether the specified room has already been checked. Here, the processor 81 determines whether the specified room has already been checked for arrival by referring the arrival check information of the room.

If "YES" is determined in the step S153, that is, if the specified room has already been checked, the room information acquisition processing is ended, and the process returns to the route search processing. On the other hand, if "NO" is determined in the step S153, that is, the specified room has not been checked, the specified room is made to be in a state having been checked in a step S155, and it is determined, in a step S157, whether the treasure chest 310 exists in the specified room. In the step S155, the processor 81 makes the specified room be in the state having been checked (TRUE) in the arrival check information of the room included in the route search information.

If "NO" is determined in the step S157, that is, if the treasure chest 310 does not exist in the specified room, the process proceeds to a step S165 shown in FIG. 27. On the other hand, if "YES" is determined in the step S157, that is, if the treasure chest 310 exists in the specified room, it is determined, in a step S159, whether the number of the opened treasure chests 310 is less than the number of the locked doors 320.

If "NO" is determined in the step S159, that is, if the number of the opened treasure chests 310 is not less than the number of the locked doors 320, the process proceeds to a step S163. On the other hand, if "YES" is determined in the step S159, that is, if the number of the opened treasure chests 310 is less than the number of the locked doors 320, a key 312 is obtained in a step S161, and the process proceeds to the step S163.

In the step S163, it is determined whether all the treasure chests 310 have been opened. If "YES" is determined in the step S163, that is, if all the treasure chests 310 are opened, the room information acquisition processing is ended, and the process returns to the route search processing. On the other hand, if "NO" is determined in the step S163, that is, if there is the treasure chest 310 not having been opened, the process proceeds to the step S165.

As shown in FIG. 27, in the step S165, it is determined whether all the the passages 306 on the up, down, left and right directions of the specified room are confirmed. If "NO" is determined in the step S165, that is, if there is a passage 306 not having been confirmed in the specified room, it is determined, in a step S167, whether there is a passage 306 in the specified direction. Although detailed description is omitted, the directions are sequentially specified in a clockwise order (or counterclockwise order) from the reference direction (for example, the up direction). In this step S167, when there is a locked door 320 in the specified direction, it is determined that a passage 306 does not exist.

If "YES" is determined in the step S167, that is, if a passage 306 exists in the specified direction, the room information acquisition processing is executed in the room beyond the passage 306 in a step S169, and the process returns to the step S165. When the processing in the step S169 is executed, the room information acquisition processing that is currently being executed is temporarily stopped. This is the same also for a case where processing in a step S179 is executed.

On the other hand, if "NO" is determined in the step S167, that is, if a passage 306 does not exist in the specified direction, it is determined, in a step S171, whether a locked door 320 exists in the specified direction. If "NO" is determined in the step S171, that is, if there is not a locked door 320 in the specified direction, the process returns to the step S165. On the other hand, if "YES" is determined in the step S171, that is, if there is a locked door 320 in the specified direction, it is determined, in a step S173, whether the route search information includes information of this locked door 320.

If "YES" is determined in the step S173, that is, if the route search information includes the information on this locked door 320, the process returns to the step S165. On the other hand, if "NO" is determined in the step S173, that is, if there is no information on this locked door 320 in the route search information, the information of this locked door 320 is added the information of this locked door 320 to the discovery information of the locked door included in the route search information in a step S175, and the process returns to the step S165.

Moreover, if "YES" is determined in the step S165, that is, if the passages 306 in the up, down, left and right directions of the specified room are all confirmed, it is determined, in a step S177, whether there is a stairs in the specified room. If "NO" is determined in the step S177, that is, if there is no stairs in the specified room, the room information acquisition processing is ended, and the process returns to the route search processing. On the other hand, if "YES" is determined in the step S177, that is, if there is a stairs in the specified room, the room information acquisition processing is executed in the room beyond the stairs in a step S179, the room information acquisition processing is ended and the process returns to the route search processing.

According to this embodiment, the game stage is created with taking into consideration connection of the passages and the stairs, presence or absence of the treasure chess and presence and absence of the locked door rather than that the game stage is created by simply connecting a start to a goal, and therefore, it is possible to create a complicated game stage. Moreover, it is possible to provide enjoyment of creating a game stage.

In addition, the key can be obtained if the treasure chest is opened according to this embodiment, but it does not need to be limited to this. The key may be contained in a container other than the treasure chest, or a key itself may be arranged in the virtual room. A key may be made to appear when satisfying a predetermined condition, such as defeat of the enemy object existing in the virtual room.

Moreover, although the locked door is provided in the passage as the prohibition element that prohibits passing through the passage that is communicated with other connected virtual room in this embodiment, but the prohibition element does not need to be limited to this. Instead of the locked door, a rock object, a stone figure object or an enemy object may be located as the prohibition element. In such a case, as the release element for releasing the prohibition element, for example, a bomb object that breaks the rock object or the stone figure object, or an item object like a weapon that defeats the enemy object corresponds. Moreover, the locked door may be released by depressing a button provided in the virtual room where the locked door is arranged, instead of the key that is the release element. In such a case, by acquiring a predetermined item object, or by defeating a predetermined enemy object, the button is made to be changed to a state capable of being depressed.

Furthermore, in this embodiment, the arrangement of the panels is restricted by providing a grid(s) that the panel cannot be arranged in the arrangement area, but other restriction may be added. In other embodiments, a type of panel to be arranged is restricted in some grids in the arrangement area. Specifically, arranging the panel corresponding to the start room, the panel corresponding to the boss room, the panel corresponding to the virtual room that the treasure chest is arranged or the panel corresponding to the virtual room that the locked door is arranged may be specified in advance in some grids. In this case, it is further determined whether the panel of the type specified in advance is arranged as the preconditions.

Furthermore, although the game stage is created using the two-dimensional panel corresponding to the two-dimensional component, and the three-dimensional game stage is created to play the game in this embodiment, the game stage may be created using the three-dimensional component.

Moreover, although the game system 1 is shown as an example of an information processing system in the above-described embodiment, the structure thereof should not be limited, and it is possible to adopt other structure. For example, although the above-described "computer" is a single computer (specifically, processor 81) in the above-described embodiment, the "computer" may be multiple computers in another embodiment. The above-described "computer" may be (multiple) computers provided on multiple devices, and more specifically, the above-described "computer" may be constituted by the processor 81 of the main body apparatus 2 and communication control units (microprocessors) 101 and 111 provided on the controllers.

Furthermore, in other embodiments, a part or all of the game control processing, the game image generation processing, the game sound generation processing, the clear-possibility determination processing, the route search processing and the room information acquisition processing shown in FIG. 21-FIG. 27 may be executed by a server on a network such as the internet. In such a case, the processor 81 of the main body apparatus 2 transmits the operation data received from the left controller 3 and the right controller 4 to the above-described server via the network communication section 82 and the network, receives a result of execution of the game control processing, the game image generation processing, the game sound generation processing, the clear-possibility determination processing, the route search processing and the room information acquisition processing by the server (i.e., game image data and the game sound data), thereby displaying the game image on the display 12 and outputting the game sound from the speaker 88. That is, it is possible to constitute an information processing system including the game system 1 shown in the above-described embodiment and the server on the network.

Moreover, although a case where the game image is displayed on the display 12 is described in the above-described embodiment, it does not need to be limited to this. The game image can be displayed also on a stationary monitor (for example, television monitor) by connecting the main body apparatus 2 to the stationary monitor via a cradle. In such a case, it is possible to constitute an information processing system including the game system 1 and the stationary monitor.

Furthermore, although the above-described embodiment is described on a case where the game system 1 having structure that the left controller 3 and the right controller 4 are attachable to or detachable from the main body apparatus 2 is used, it does not need to be limited to this. For example, it is possible to use an information processing apparatus such a game apparatus that an operation portion having operation buttons and analog sticks similar to those of the left controller 3 and the right controller 4 is provided integrally with the main body apparatus 2 or further electronic equipment capable of executing a game program. The further electronic equipment corresponds to smartphones, tablet PCs or the like. In such a case, an operation portion may constitute with software keys.

Moreover, in other embodiments, the left controller 3 and the right controller 4 may be integrally constituted by coupling them to each other to be used as a single controller.

Furthermore, specific numeral values and images shown in the above-described embodiment are mere examples and can be appropriately changed according to actual products.

Although certain example systems, methods, storage media, devices and apparatuses have been described herein, it is to be understood that the appended claims are not to be limited to the systems, methods, storage media, devices and apparatuses disclosed, but on the contrary, are intended to cover various modifications and equivalent arrangements included within the spirit and scope of the appended claims.

What is claimed is:

1. A non-transitory computer-readable storage medium storing an information processing program that is executable by a computer of an information processing apparatus to create a game stage for playing a game, wherein the information processing program causes one or more processors of the computer to execute:
    setting an initial position of a player object in the game stage;
    arranging in a position in the game stage a prohibition element prohibiting the player object from passing through in the game, the position being based on designation by a user;
    arranging in a position in the game stage a release element releasing the prohibition element to allow the player object to pass through in the game, the position being based on designation by the user;
    determining whether the player object can arrive at a specific position on the game stage based on the initial position, the number and arranged position of the prohibition element, and the number and arranged position of the release element; and
    generating, on condition that it is determined that the player object can arrive at the specific position, an indication that indicates to the user that the player object can arrive at the specific position.

2. The storage medium according to the claim 1, wherein the information processing program causes the one or more processors to execute performing the game where the player object is operated in a game space based on the game stage.

3. The storage medium according to the claim 2, wherein the information processing program causes the one or more processors to execute setting in the game stage a clear condition for clearing the game stage.

4. The storage medium according to the claim 3, wherein the information processing program causes the one or more processors to execute setting in the game stage an end position that is a position necessary to be arrived at in order to satisfy the clear condition; and arranging in the game stage a first prohibition element that is the prohibition element that prohibits passing to the end position, wherein
the first prohibition element is released by a first release element that is different from a second release element that releases a second prohibition element that is the prohibition element other than the first prohibition element.

5. The storage medium according to the claim 4, wherein the information processing program causes the one or more processors to execute setting the release element that the player object obtains lastly as the first release element.

6. The storage medium according to the claim 3, wherein the information processing program causes the one or more processors to execute arranging in a position in the game stage a potential release element from which the release element is obtainable, the position being based on designation by the user, wherein
on condition that the clear condition can be satisfied even if the release element is not obtained from the potential release element, the release element is not obtained from the potential release element.

7. The storage medium according to the claim 2, wherein the release element is obtained by the player object, and the information processing program causes the one or more processors to execute reducing the number of release element possessed by the player object every time that the player object releases the prohibition element.

8. The storage medium according to the claim 1, wherein the information processing program causes the one or more processors to execute arranging a special transfer element by which the player object is movable from a position in the game stage to a further separate position, the position being based on designation by the user.

9. The storage medium according to the claim 1, wherein the information processing program causes the one or more processors to execute outputting information for indicating a position that the player object can arrive at from the initial position in a manner distinguishable from a position that the player object cannot arrive at.

10. The storage medium according to the claim 1, wherein the information processing program causes the one or more processors to execute generating the game space based on a game component arranged by the user.

11. The storage medium according to the claim 10, wherein the game component expresses at least one of a room and a passage in the game stage.

12. The storage medium according to the claim 10, wherein the information processing program causes the one or more processors to execute arranging the prohibition element based on arrangement of the game component including the prohibition element.

13. The storage medium according to the claim 10, wherein the information processing program causes the one or more processors to execute arranging the release element based on arrangement of the game component including the release element.

14. The storage medium according to the claim 10, wherein the game component is a panel that is to be arranged within a predetermined arrangement frame.

15. The storage medium according to the claim 1, wherein the information processing program causes the one or more processors to execute determining that the game stage is completed on condition that the specific position necessary to satisfying the clear condition can be arrived at, and allowing to play the game on condition that it is determined that the game stage is completed.

16. An information processing apparatus that creates a game stage for playing a game, and comprises one or more processors configured to execute:
setting an initial position of a player object in the game stage;
arranging in a position in the game stage a prohibition element prohibiting the player object from passing through in the game, the position being based on designation by a user;
arranging in a position in the game stage a release element releasing the prohibition element to allow the player object to pass through in the game, the position being based on designation by the user;
determining whether the player object can arrive at a specific position on the game stage based on the initial position, the number and arranged position of the prohibition element, and the number and arranged position of the release element; and
generating, on condition that it is determined that the player object can arrive at the specific position, an indication that indicates to the user that the player object can arrive at the specific position.

17. An information processing system that creates a game stage for playing a game, and comprises one or more processors configured to execute:
setting an initial position of a player object in the game stage;
arranging in a position in the game stage a prohibition element prohibiting the player object from passing through in the game, the position being based on designation by a user;
arranging in a position in the game stage a release element releasing the prohibition element to allow the player object to pass through in the game, the position being based on designation by the user;
determining whether the player object can arrive at a specific position on the game stage based on the initial position, the number and arranged position of the prohibition element, and the number and arranged position of the release element; and
generating, on condition that it is determined that the player object can arrive at the specific position, an indication that indicates to the user that the player object can arrive at the specific position.

18. An information processing method executed by an information processing system that creates a game stage for playing a game, comprising:
setting an initial position of a player object in the game stage;
arranging in a position in the game stage a prohibition element prohibiting the player object from passing through in the game, the position being based on designation by a user;
arranging in a position in the game stage a release element releasing the prohibition element to allow the player object to pass through in the game, the position being based on designation by the user;
determining whether the player object can arrive at a specific position on the game stage based on the initial position, the number and arranged position of the prohibition element, and the number and arranged position of the release element; and generating, on condition that it is determined that the player object can arrive at the specific position, an indication that indicates to the user that the player object can arrive at the specific position.

\* \* \* \* \*